(12) United States Patent
Hashimoto et al.

(10) Patent No.: US 6,580,048 B2
(45) Date of Patent: Jun. 17, 2003

(54) ELECTRICAL DISCHARGE MACHINING APPARATUS SUPPLYING INITIAL AND PROCESSING CURRENTS

(75) Inventors: Takashi Hashimoto, Tokyo (JP); Akihiro Suzuki, Tokyo (JP); Taichirou Tamida, Tokyo (JP); Akihiko Iwata, Tokyo (JP); Yoshikazu Tsunoda, Tokyo (JP); Hiroyuki Ooguro, Tokyo (JP); Yoshikazu Ukai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/847,359

(22) Filed: May 3, 2001

(65) Prior Publication Data

US 2002/0092832 A1 Jul. 18, 2002

(30) Foreign Application Priority Data

Dec. 1, 2000 (JP) ........................................ 2000-367682
Jan. 16, 2001 (JP) ........................................ 2001-008290

(51) Int. Cl.$^7$ ................................................ B23H 1/02
(52) U.S. Cl. ................................ 219/69.13; 219/69.18
(58) Field of Search ............................ 219/69.13, 69.18

(56) References Cited

U.S. PATENT DOCUMENTS

| | | | | | |
|---|---|---|---|---|---|
| 4,864,092 A | * | 9/1989 | Obara | ...................... | 219/69.18 |
| 5,386,095 A | * | 1/1995 | Kaneko et al. | .......... | 219/69.18 |
| 6,107,593 A | * | 8/2000 | Tsai et al. | ................. | 219/69.13 |
| 6,281,463 B1 | * | 8/2001 | Kaneko et al. | .......... | 219/69.13 |

FOREIGN PATENT DOCUMENTS

| JP | 60-155321 A | * | 8/1985 | .............. | 219/69.13 |
|---|---|---|---|---|---|
| JP | A1 11-48039 | | 2/1999 | | |

* cited by examiner

*Primary Examiner*—Geoffrey S. Evans
(74) *Attorney, Agent, or Firm*—Leydig, Voit & Mayer, Ltd.

(57) ABSTRACT

Charge accumulated in a capacitor is used to provide a processing current flow between a target and an electrode. When a diode is turned on, a first dc power supply is used to provide the processing current flow between the target and the electrode. In this state, after a lapse of a predetermined time, the current supply using the first dc power supply is stopped, and an induced electromotive voltage, induced by two floating reactors, is used to rapidly drop the processing current flowing between the target and the electrode, while charging the capacitor.

10 Claims, 30 Drawing Sheets

ELECTRICAL DISCHARGE MACHINING APPARATUS SUPPLYING INITIAL AND PROCESSING CURRENTS

FIELD OF THE INVENTION

The present invention relates to a discharge processing device which can improve the processing efficiency while reducing the damage to switching elements at the time of discharge-processing a target.

BACKGROUND OF THE INVENTION

The principle of target discharge processing and current waveforms required when the discharge processing is carried out will be explained first.

In a discharge processing, a discharge is started in the following manner: between a gap of an electrode and a target placed so as to face the electrode, after a minute conductive path not more than several tens gm has been found, a pulse current is allowed to flow through the minute conductive path so that the minute transport path or the electrode and a minute portion of the target contacting the path are forcefully evapotranspirated or fused and scattered by thermal energy generated at this point. In this case, the degree of evapotranspiration and fusing and scattering at the minute portion is determined by the following factors: the rate of change in time of the pulse current, that is, a current having an abrupt rising characteristic, the size of a current peak value, thermal characteristics of the electrode and target material and cooling characteristics of an insulating solution, etc.

When the target is made from a material having small electrical resistance, heat generation due to Joule heat becomes smaller. Furthermore, when the target is made from a material having superior thermal conductivity, the heat generation and temperature rise at the minute portion are lowered. Moreover, when the target is made from a material having high melting temperature, it is hardly melted even when heated. Furthermore, when the target is made from a material having high viscosity at the time of fusing, it is hardly scattered even when fused.

In an actual processing operation, these conditions are combined so that the resulting phenomena are a slow processing rate, a rough surface or a fine surface, susceptibility to short-circuiting, susceptibility to degradation in the processing efficiency and susceptibility to a concentrated discharge. Moreover, in the case of a wire discharge processing, the resulting phenomena are more short-circuiting and high frequency in wire disconnection.

Moreover, conventionally, in order to eliminate the short-circuiting phenomenon, alloys made of materials having a low fusing temperature and fusing latent heat or a low viscosity at the time of fusing, that is, materials having smoothness, have been used as the electrode material. Alloys such as brass are listed as these alloys; however, since these materials raise a problem of electrode consumption, etc., they are not used so much except for wire discharge processing machines and high-speed thin-pore processing machines. Here, a special wire which is coated with a material having a low fusing temperature and a small viscosity at the time of fusing has been developed as a wiring electrode for use in a wire discharge processing, and the application of such a special wire makes it possible to improve the processing efficiency while preventing the above-mentioned short-circuiting.

Moreover, after the start of the discharge, the insulating solution on the periphery of the discharge is evaporated so that a bubble that abruptly expands is formed. Thus, this internal pressure results in a reaction that scoops the fused portion out. As the discharging time elapses, the fused portion gradually expands, and as the bubble expands, the density of the generated inner pressure becomes smaller. Therefore, there is a greatest value in the amount of the scooped portion determined by the material and the discharging time, and both of a shortened discharging time (pulse width) and a lengthened discharging time cause degradation in the processing efficiency. In particular, even when the discharging time (pulse width) is lengthened exceeding the time required, the excessive discharging time is consumed as heat generation and fusing of the electrode and the target, resulting in a unwanted thick processed surface of the fused layer.

For this reason, respective conditions, which include the current peak value and the current rising rate that serve as discharge starting capabilities with the discharging time (pulse width) serving as a processing capability added thereto, are preferably set so as to be selected independently, depending on differences in thermal characteristics of the electrode, target and insulating solution. Moreover, when a pulse having a triangular waveform is used in such a very small area of a pulse width as described earlier, it is not possible to carry out an efficient processing operation.

When the same quantity of charge is applied in a rectangular waveform and a triangular waveform, the effective current value is smaller in the rectangular waveform. Therefore, when a shift is made from the triangular waveform to the rectangular waveform, heat input to the electrode can be reduced and the processing capability is improved. In particular, in the case of the wire discharge processing device, this arrangement is very effective since it prevents wire disconnection.

Japanese Laid-Open Patent Application No. 11-48039 discloses a discharge processing device in which the rising rate and pulse width of the above-mentioned electric current are independently controlled so as to provide an efficient processing operation. FIG. 30 shows a circuit structure thereof. Reference number 101 denotes a main dc power supply and reference number 102 denotes a sub dc power supply which supplies a voltage lower than the output voltage of the main dc power supply 101. Moreover, reference symbols T101, T102 and T103 denote first, second and third switching elements constituted by FETs.

The positive terminal of the main dc power supply 101 is connected to a target W through the first switching element T101, and the positive terminal of the sub dc power supply 102 is connected to the target W through the third switching element T103. Furthermore, the negative terminals of the main and sub dc power supplies 101 and 102 are connected to an electrode P through the second switching element T102. To the gates G101 to G103 of the FETs constituting the switching elements T101, T102 and T103 are connected switching element driving circuits (not shown), and the respective switching element driving circuits are allowed to on-off control the respective switching elements T101, T102 and T103 by using pulses output from a pulse distribution circuit (not shown).

FIG. 31 is a schematic drawing that exemplifies the relationship between the operational timing and the waveform of the discharging current (processing current) in the discharge processing device of FIG. 30.

When the discharge processing operation is started by the discharge processing device, pulse width setting data $t_1$ and $t_2$ are set in accordance with a dischargeable state between the electrode P and the target W. Based upon these settings, a pulse signal having the pulse width $t_2$ is output from each of the switching element driving circuits, with the result that the second and third switching elements T102 and T103 are turned on as shown by (a) and (c) in FIG. 31.

As a result, the voltage of the sub dc power supply 102 is applied between the target W and the electrode P through the third switching element T103 and the second switching element T102 so that a current $I_1(=I_0)$ flows from the sub dc power supply 102, thereby securing a current applying point (see(e) in FIG. 31). This is also referred to as a preliminary discharge which aims to secure the current applying point, and a separate power supply system may be installed for use in the preliminary discharge. The rise of this current is gradual since the output voltage of the sub dc power supply 102 is low. However, after a delay time successively set, a pulse having the time width $t_1$ that has been set by the current peak value setting data is output from the rest of the switching element driving circuits, thereby turning the first switching element T101 on (see (a) in FIG. 31).

As a result, a current starts to flow from the main dc power supply 101 having a high voltage to form a processing current $I_0$ that increases with an abrupt rise, as shown by (d) in FIG. 31, between the target W and the electrode P. Here, the period of this abrupt rise of the processing current $I_0$ is defined as an initial processing period. When, after the lapse of the set time width $t_1$, the first switching element T101 is turned off, the rise of the processing current $I_0$ stops, and the current $I_0$ is again supplied to the gap from the sub dc power supply 102 so that the processing current $I_0$ is maintained at its peak value. Here, this period during which the processing current is maintained virtually at its peak value is defined as a mid process period.

After the lapse of the set time width $t_2$ for use in setting the pulse width, the second and third switching elements T102 and T103 are turned off, and the currents $I_2$, $I_3$, which have been accumulated by an inductance within the circuit, are allowed to flow from the diode D101 to the target W to the electrode P to the diode D102 to the main dc power supply 101 so as to be fed back. At this time, since the feeding back is made to the main dc power supply 101 having a higher voltage, the falling rate of this processing current ($I_2=I_3=I_0$) becomes abrupt.

Thereafter, this operation is repeatedly executed so that the discharge processing is carried out. Here, the processing current $I_0$ after the stoppage of the application of the voltage is referred to as a last processing period.

As understood from FIG. 31, the processing pulse width is virtually determined by the pulse width setting data $t_2$ that turns the second and third switching elements T102 and T103 on, and the peak value $I_p$ of the processing current $I_0$ is determined by the current peak value setting data $t_1$ that turns the first switching element T101 on. Therefore, it is possible to easily set the current peak value $I_p$ and the processing pulse width. Moreover, it is possible to provide an abrupt rise and an abrupt fall of the processing current $I_0$ and consequently to maintain a processing current waveform having a virtually rectangular wave shape; thus, it becomes possible to improve the processing efficiency.

However, in the above-mentioned conventional discharge processing apparatus, the main dc power supply 101 applies a voltage between the electrode P and the target W so as to allow the discharging current to flow between them. Therefore, at the switching time of the initial processing period and the mid processing period, the current is supplied from the main dc power supply 101 through the switching element T101, and in a state where the current peak has been attained, the switching element T101 has to be turned off. The resulting problem is that the FETs constituting the switching element T101 have greater heat generation.

In order to reduce heat generation of the FETs constituting the switching element T101, high-performance heat-releasing fins have to be provided and multiple of these have to be aligned in parallel with each other. There is a problem in this that a switching element having a great capacity needs to be used as the switching element T101 and it becomes difficult to reduce costs.

Another problem arises in a current feed back in the last processing period. In other words, in the conventional method, after the stoppage of the voltage application from the sub dc power supply 102, the induced energy accumulated in the circuit is fed back to the main dc power supply 101 so that the current feed back is started from a voltage value that is determined by the main dc power supply 101. For this reason, the voltage value at the time of the current feed back tends to go beyond the power supply voltage, and this extremely high voltage has to be taken into consideration so that the voltage resistance of the switching element T101 has to be set high.

Therefore, the resulting problems are that the conventional technique requires high costs and is susceptible to malfunction.

SUMMARY OF THE INVENTION

It is an object of this invention to provide a discharge processing device which can start applying a processing current between the target and the electrode by using energy accumulated in a capacitor of the initial current supplying circuit so that it is possible to use a switching element having a low voltage resistance and a low capacity so as to reduce the costs of the entire device, to simplify the adjustments of the peak value and the processing pulse width of the discharge processing current, to provide abrupt rising and falling portions of the discharge processing current waveform, and consequently to improve the discharge processing efficiency.

It is also an object of this invention to provide a discharge processing device which, even when the value of the voltage output from the capacitor of the initial current supplying circuit becomes lower than a voltage value preliminarily set, allows a diode to detect this fact so as to apply a current for use in mid processing period to flow between the target and the electrode, without the need of using a switching element driving circuit, etc. so as to on/off control each switching element so that it is possible to use a switching element having a low voltage resistance and a low capacity so as to reduce the costs of the entire device, to simplify the adjustments of the peak value and the processing pulse width of the discharge processing current, to provide abrupt rising and falling portions of the discharge processing current waveform, and consequently to improve the discharge processing efficiency.

It is also an object of this invention to provide a discharge processing device which can prevent a charge from being accumulated in the capacitor of the initial current supplying circuit beyond a quantity required for the capacitor of the initial current supplying circuit so as to prevent disturbances in a processing current waveform of the next cycle and thereafter and consequently to provide an accurate control, so that it becomes possible to use a switching element having a low voltage resistance and a low capacity so as to reduce the costs of the entire device, to simplify the adjustments of the peak value and the processing pulse width of the discharge processing current, to provide abrupt rising and falling portions of the discharge processing current waveform, and consequently to improve the discharge processing efficiency.

It is also an object of this invention to provide a discharge processing device which allows the capacitor of the initial current supplying circuit to accumulate a sufficient quantity of charge required so as to prevent disturbances in a processing current waveform of the next cycle and thereafter and consequently to provide an accurate control, so that it becomes possible to use a switching element having a low voltage resistance and a low capacity so as to reduce the costs of the entire device, to simplify the adjustments of the peak value and the processing pulse width of the discharge processing current, to provide abrupt rising and falling portions of the discharge processing current waveform, and consequently to improve the discharge processing efficiency.

It is also an object of this invention to provide a discharge processing device which, even when the dc power supply contains floating inductance components, provides an abrupt rising portion in the processing current waveform so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current.

It is also an object of this invention to provide a discharge processing device which, even in the case of a low arc voltage, can maintain a virtually rectangular processing current waveform so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current.

It is also an object of this invention to provide a discharge processing device which prevents the current value of the mid processing period from becoming far greater than the current value of the initial processing period so as to maintain a virtually rectangular processing current waveform so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current.

It is also an object of this invention to provide a discharge processing device which allows the capacitor of the initial current supplying circuit to maintain a sufficient charge so as to prevent disturbances in the processing current waveform in the next cycle and thereafter and consequently to provide an accurate control, so that it becomes possible to use a switching element having a low voltage resistance and a low capacity so as to reduce the costs of the entire device, to simplify the adjustments of the peak value and the processing pulse width of the discharge processing current, to provide abrupt rising and falling portions of the discharge processing current waveform, and consequently to improve the discharge processing efficiency.

It is also an object of this invention to provide a discharge processing device which, prior to starting a processing operation on the target, allows the capacitor of the initial current supplying circuit to accumulate a sufficient charge so as to provide an abrupt rising portion of the discharge processing current waveform in the initial processing period, so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current.

It is also an object of this invention to provide a discharge processing device which varies the layout of the capacitor of the initial current supplying circuit so as to further improve the degree of freedom in designing, so that it becomes possible to use a switching element having a low voltage resistance and a low capacity so as to reduce the costs of the entire device, to simplify the adjustments of the peak value and the processing pulse width of the discharge processing current, to provide abrupt rising and falling portions of the discharge processing current waveform, and consequently to improve the discharge processing efficiency.

It is also an object of this invention is to provide a discharge processing device which, prior to starting a processing operation on the target, allows the capacitor of the initial current supplying circuit to accumulate a sufficient charge so as to provide abrupt rising and falling portions of the discharge processing current waveform in the initial processing period, so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current.

It is also an object of this invention is to provide a discharge processing device which freely adjusts a charge to be accumulated in the capacitor of the initial current supplying circuit so as to provide an abrupt rising portion of the discharge processing current waveform in the initial processing period, so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current.

It is also an object of this invention is to provide a discharge processing device which freely adjusts a charge to be accumulated in the capacitor of the initial current supplying circuit in a stepped manner so as to provide an abrupt rising portion of the discharge processing current waveform in the initial processing period, so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current.

It is also an object of this invention to provide a discharge processing device which maintains a switching element having required voltage resistant and current capacity independent of the voltage resistance and current capacity of the switching element so as to reduce the costs of the entire device, so that it becomes possible to improve the discharge processing efficiency, while reducing the costs of the entire device, and consequently to simplify the adjustments of the peak value and the processing pulse width of the discharge processing current.

The discharge processing device according to this invention processes a target by applying a processing current between the target and an electrode. This device comprises, an initial-stage current supplying circuit having a capacitor which supplies an initial current, which initial-stage current supplying circuit applies the processing current between the target and the electrode during an initial processing period; an intermediate-stage current supplying circuit having a dc power supply, which intermediate-stage current supplying circuit applies the processing current between the target and the electrode during an intermediate processing period; and a feedback circuit that charges the capacitor of the initial-stage current supplying circuit by dielectric energy accumulated during the intermediate processing period, during a last-processing period.

According to the above-mentioned aspect, in the discharge processing device which processes a target by applying a processing current between the target and the electrode, during the initial processing period, the initial-stage current supplying circuit having a capacitor of the initial current supplying circuit allows a processing current to flow between the target and the electrode. Furthermore, during the intermediate processing period, the intermediate-stage current supplying circuit having a dc power supply allows a processing current to flow between the target and the electrode. Finally, during the last-processing period, the feedback circuit converts dielectric energy accumulated during the intermediate processing period into an induced electromotive force so as to charge the capacitor of the initial current supplying circuit.

Accordingly, a processing current is allowed to start to flow between the target and the electrode by using the energy accumulated in the capacitor of the initial current supplying circuit. As a result, it is possible to use a switching element having a low voltage resistance and a low capacity so as to reduce the costs of the entire device, to simplify the adjustments of the peak value and the processing pulse width of the discharge processing current, to provide abrupt rising and falling portions of the discharge processing current waveform, and consequently to improve the discharge processing efficiency.

Other objects and features of this invention will become apparent from the following description with reference to the accompanying drawings.

DESCRIPTION OF THE PREFERRED EMBODIMENTS

Preferred embodiments of the discharge processing device in accordance with the present invention will be explained in detail below with reference to the accompanying drawings.

Figure 1:
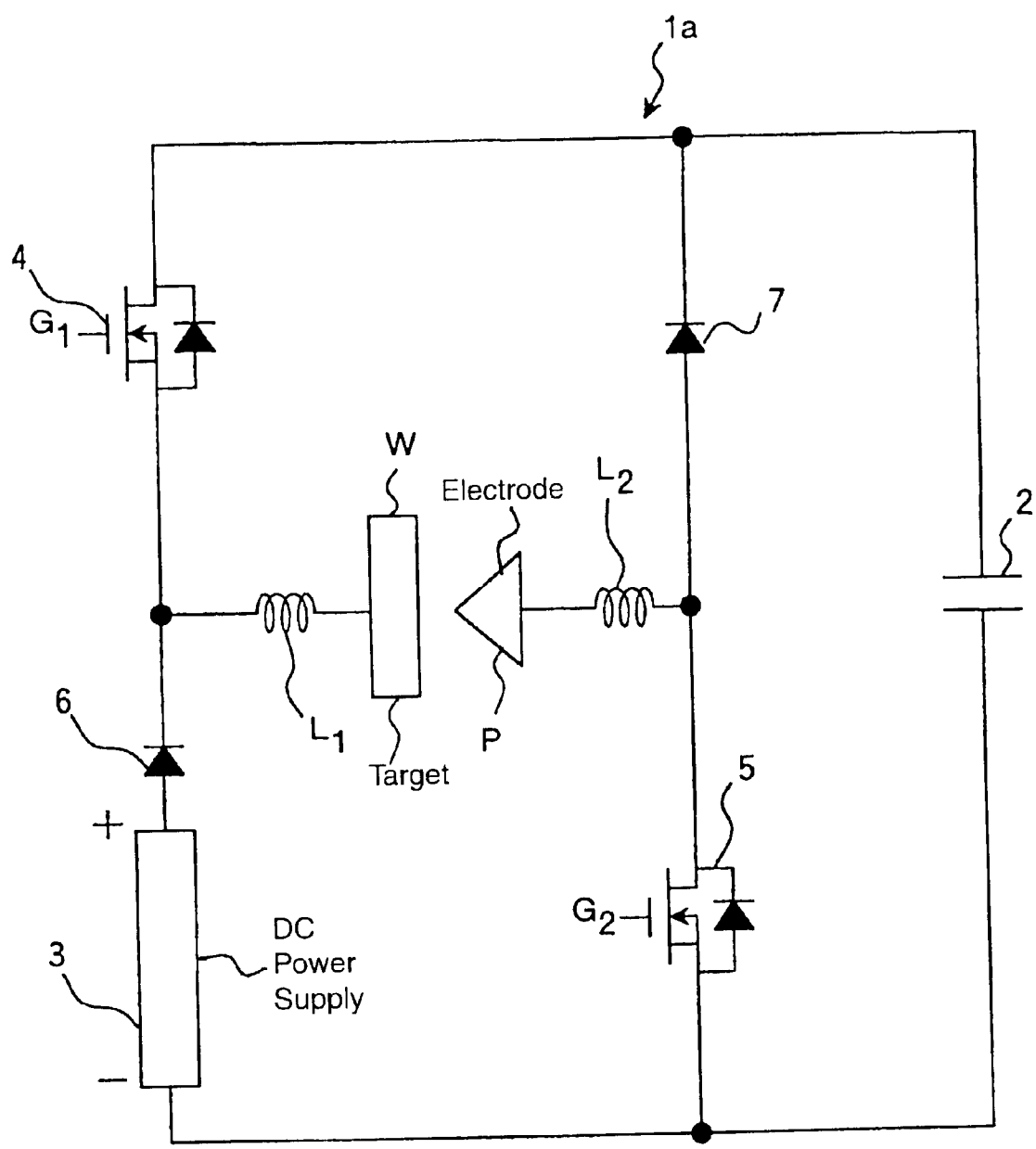
FIG. 1 is a block diagram that shows a discharge processing device in accordance with a first embodiment of the present invention.

FIG. 1 is a block diagram that shows a discharge processing device in accordance with the first embodiment of the present invention.

The discharge processing device 1a according to the first embodiment comprises a capacitor 2 which applies a terminal voltage between a target W and an electrode P during an initial processing period so as to allow a current "$I_1$" of the initial processing period to flow. A first dc power supply 3 applies a terminal voltage between the target W and the electrode P during a mid processing period so as to allow a current "$I_2$" of the mid processing period to flow. First and second switching elements 4 and 5 include transistors, FETs, etc. These first and second switching elements 4 and 5, upon receipt of a pulse "$VG_1$" or "$VG_2$" output from a switching element driving circuit (not shown), switch power supply paths to the target W. A diode 6 is provided which, upon drop of the terminal voltage of the capacitor 2, detects this and is turned on. A diode 7 is provided which, when the outputs of the pulses "$VG_1$" and "$VG_2$" output from the switching element driving circuit are stopped so that the first and second switching elements 4 and 5 are turned off to start a last processing period, is turned on so that an induced electromotive current "$I_3$" generated on floating reactors $L_1$ and $L_2$ possessed by cables connected to the target W and the electrode P is directed to the capacitor 2 so as to charge this.

The charge accumulated in the capacitor 2 is first used so as to allow a processing current "Ipw" to flow between the target W and the electrode P, and thereafter, when the diode 6 has been turned on, the first dc power supply 3 allows the processing current "Ipw" to flow between the target W and the electrode P. In this state, after a lapse of a predetermined time, the current supply using the first dc power supply 3 is stopped, and while the induced electromotive voltage induced by the floating reactors "$L_1$" and "$L_2$" is used to charge the capacitor 2, the processing current "Ipw" flowing between the target W and the electrode P is rapidly reduced.

Figure 2:
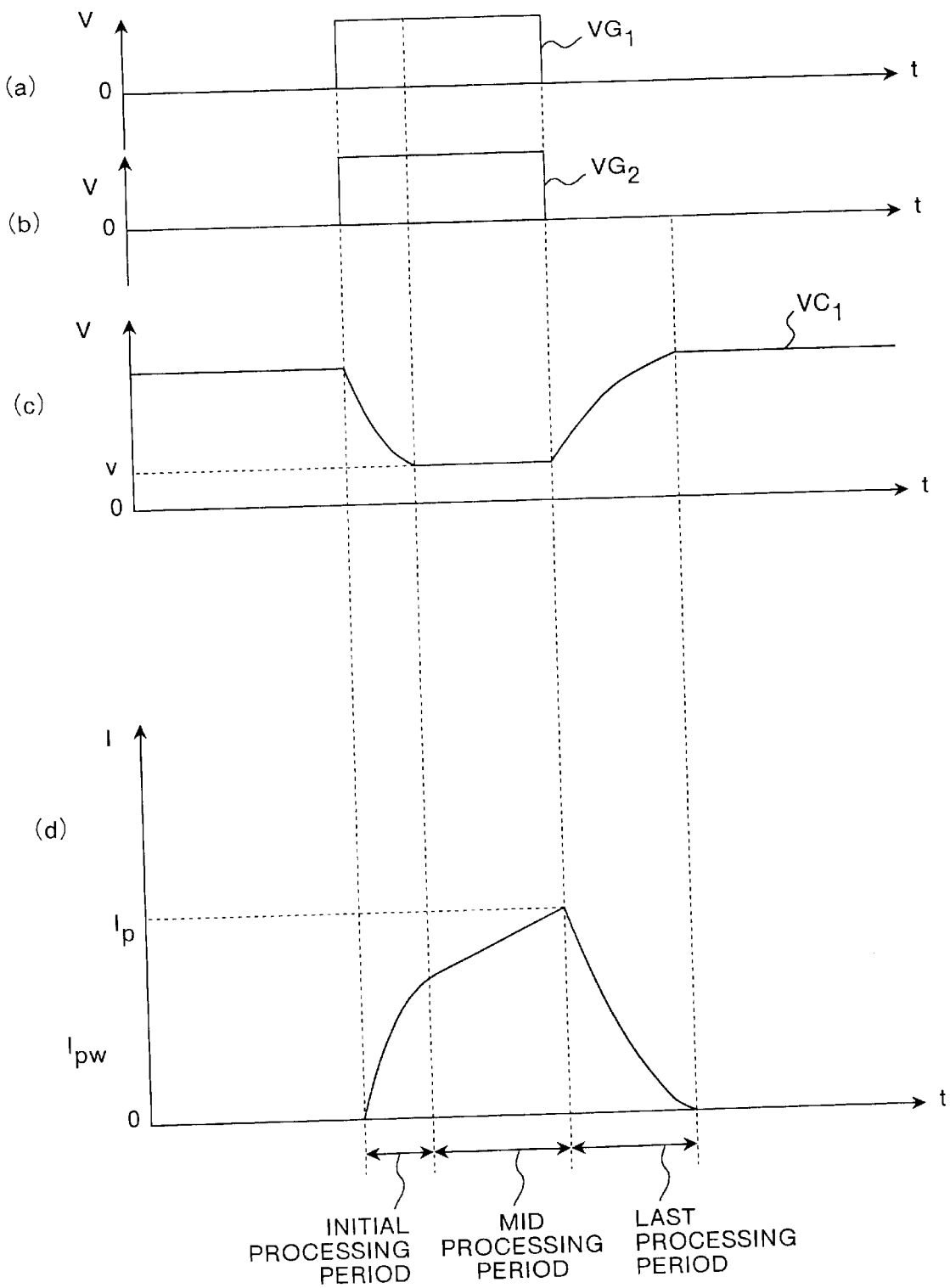
FIG. 2 is a waveform diagram that shows an operation example of the discharge processing device shown in FIG. 1.
Figure 3:
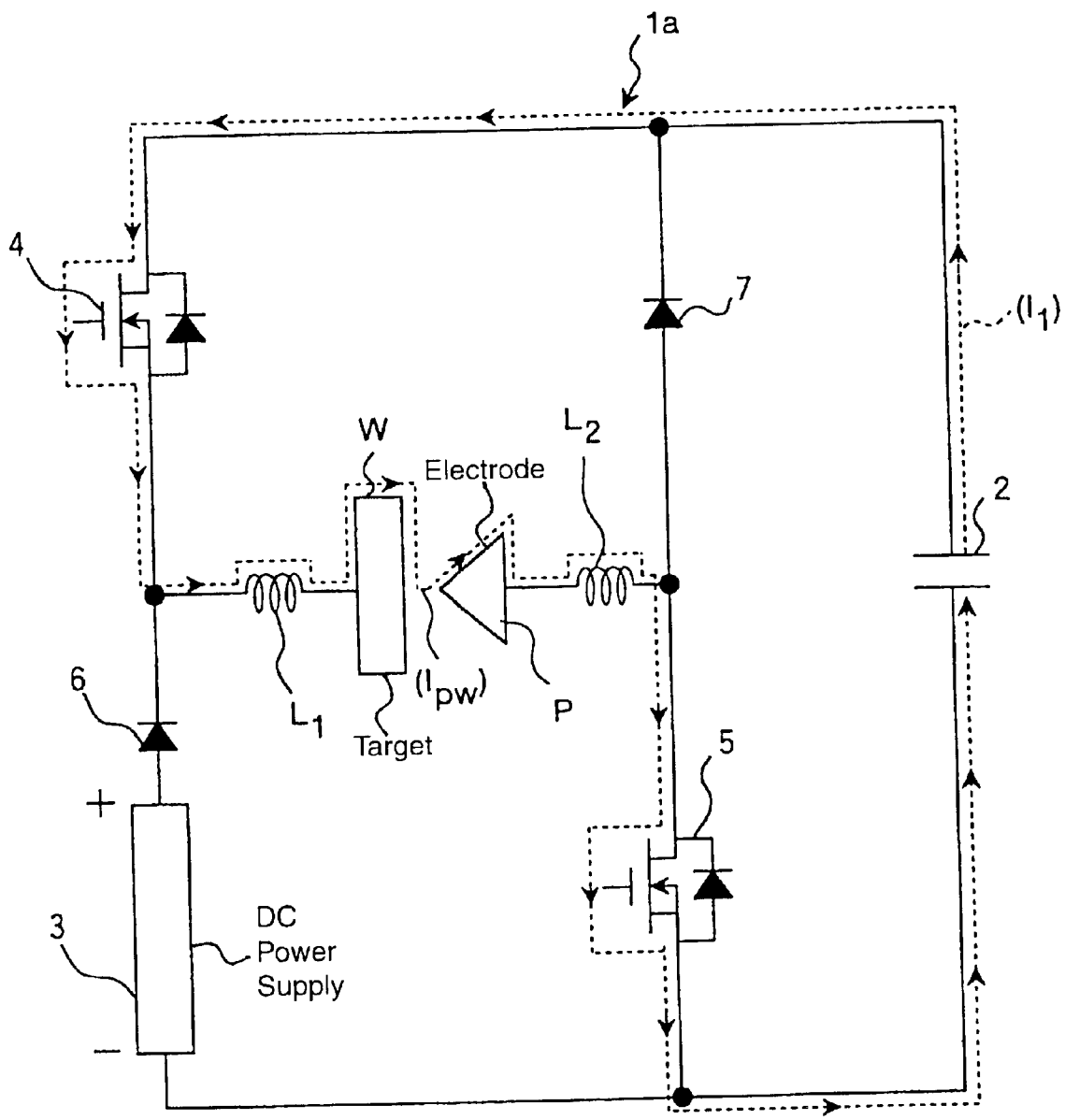
FIG. 3 is a schematic drawing that shows an operation example of the discharge processing device shown in FIG. 1 during an initial processing period.

Next, referring to waveform diagrams shown in FIG. 2 and schematic drawings of FIG. 3 to FIG. 5, a detailed explanation will be given of the operation of the discharge processing device 1a. First, as illustrated by (a) and (b) in FIG. 2, when the pulses "$VG_1$" and "$VG_2$" are output from the switching element driving circuit during the initial processing period, the first switching element 4 and the second switching element 5 are turned on so that a charge accumulated in the capacitor 2 is used to allow a current "$I_1$" to flow in the following loop as illustrated in FIG. 3: one end of the capacitor 2 to the first switching element 4 to the floating reactor $L_1$ to the target W to the electrode P to the floating reactor $L_2$ to the second switching element 5 to the other end of the capacitor 2. Thus, as illustrated by (d) in FIG. 2, a processing current "Ipw" having the same value as the current "$I_1$" is allowed to flow between the target W and the electrode P.

Figure 4:
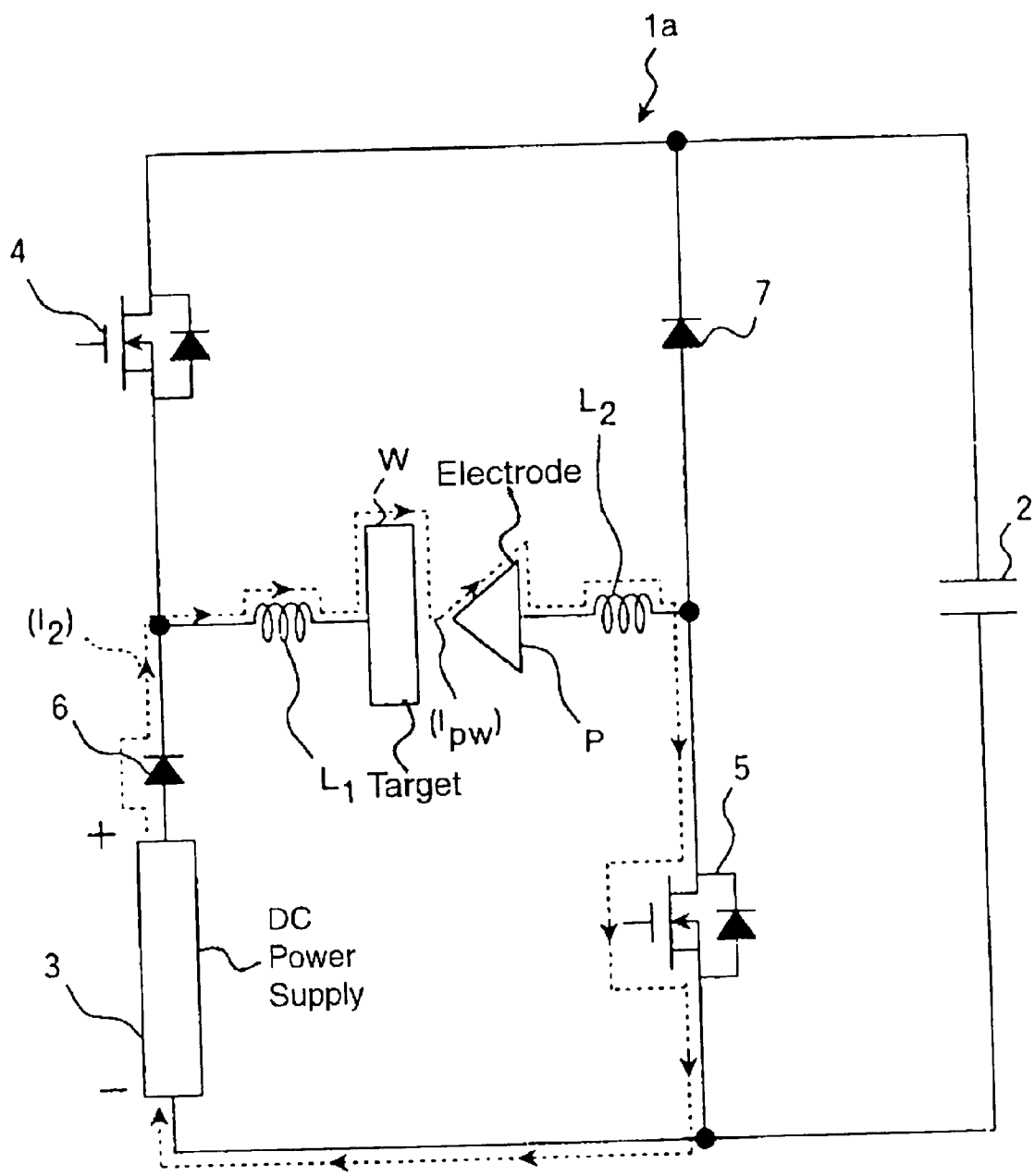
FIG. 4 is a schematic drawing that shows an operation example of the discharge processing device shown in FIG. 1 during a mid processing period.
Figure 5:
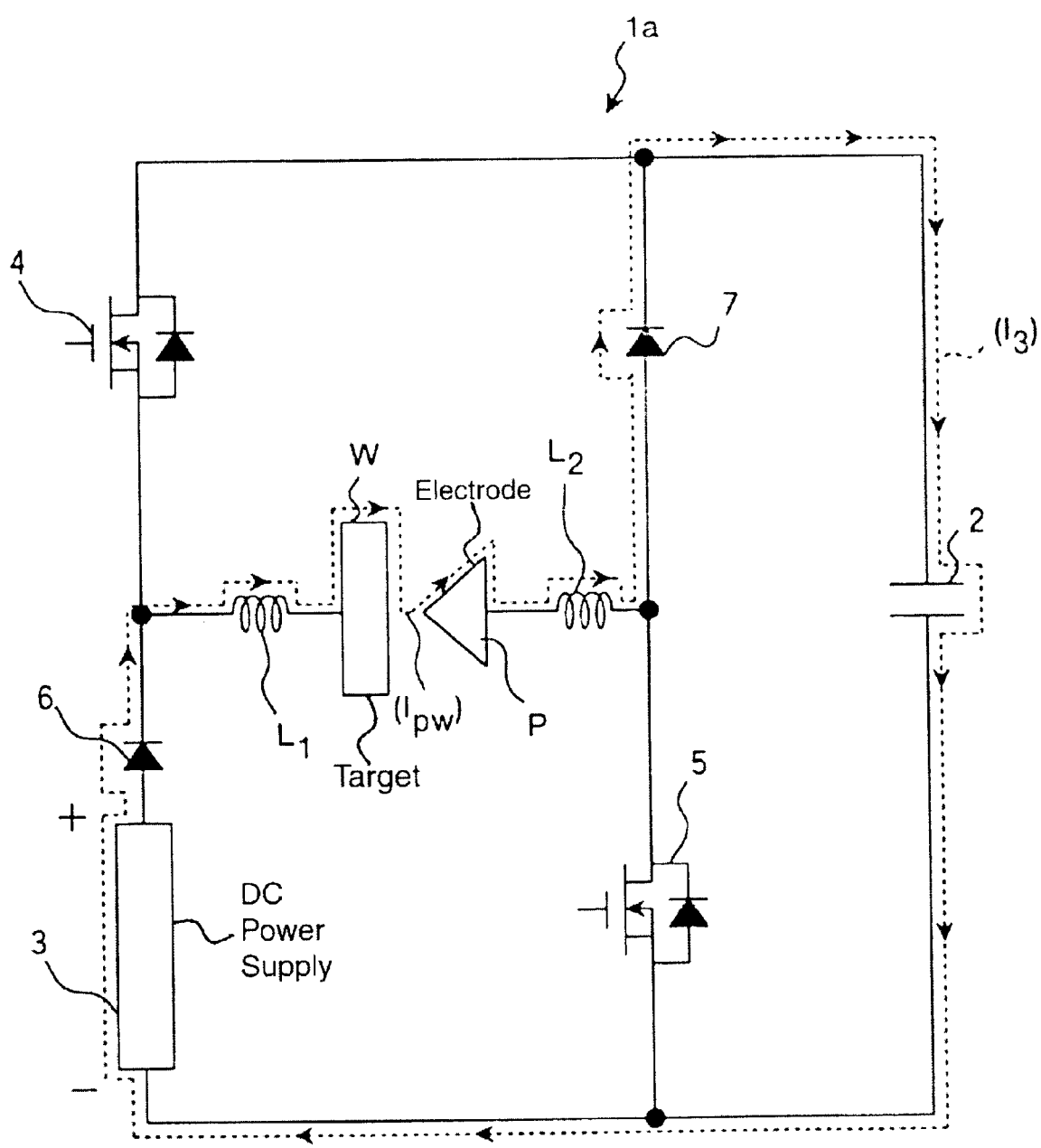
FIG. 5 is a schematic drawing that shows an operation example of the discharge processing device shown in FIG. 1 during a last processing period.

Thereafter, as illustrated by (c) in FIG. 2, when the terminal voltage $VC_1$ of the capacitor 2 drops to become virtually coincident with the dc voltage of the first dc power supply 3 so that the diode 6 is turned on, an operation during the mid processing period is started so that as illustrated in FIG. 4, a current "$I_2$" is allowed to flow in the following loop as illustrated in FIG. 4: the positive terminal of the first dc power supply 3 to the floating reactor $L_1$ to the target W to the electrode P to the floating reactor $L_2$ to the second switching element 5 to the negative terminal of the second dc power supply 3. Thus, a current "Ipw" having the same value as the current "$I_2$" is allowed to flow between the target W and the electrode P.

Next, when, after a lapse of a predetermined time, the pulses "$VG_1$" and "$VG_2$" are no longer output from the switching element driving circuit, an operation during the last processing period is started so that the first and second switching elements 4 and 5 are turned off. Thus, induced energy, accumulated in the floating reactors $L_1$ and $L_2$, is used to generate an induced electromotive voltage so that an induced current "$I_3$" is allowed to flow in the following loop as illustrated in FIG. 5: the floating reactor $L_2$ to the diode 7 to the capacitor 2 to the first dc power supply 3 to the diode 6 to the floating reactor $L_1$ to the target W to the electrode P to the floating reactor $L_2$. Thus, while the processing current "Ipw" flowing between the target W and the electrode P is rapidly reduced, the charge is accumulated in the capacitor 2, thereby increasing the terminal voltage.

Figure 6:
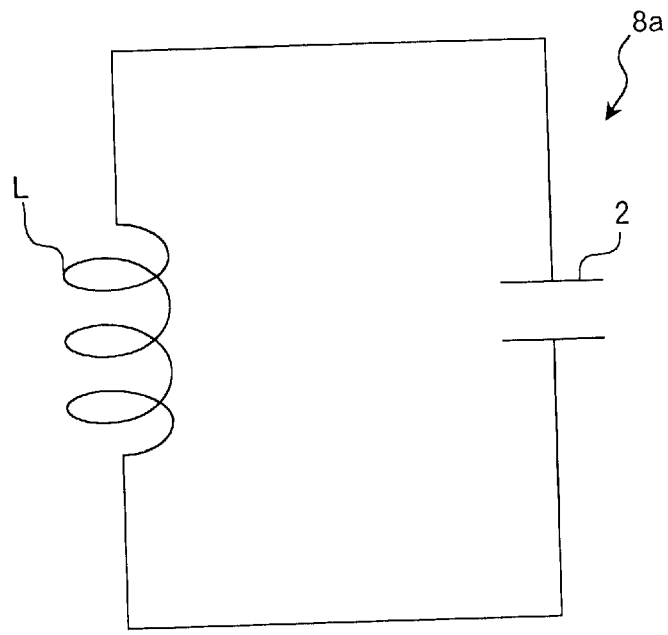
FIG. 6 is a schematic drawing that shows an example of an equivalent circuit in the discharge processing device shown in FIG. 1 during the initial processing period.
Figure 7:
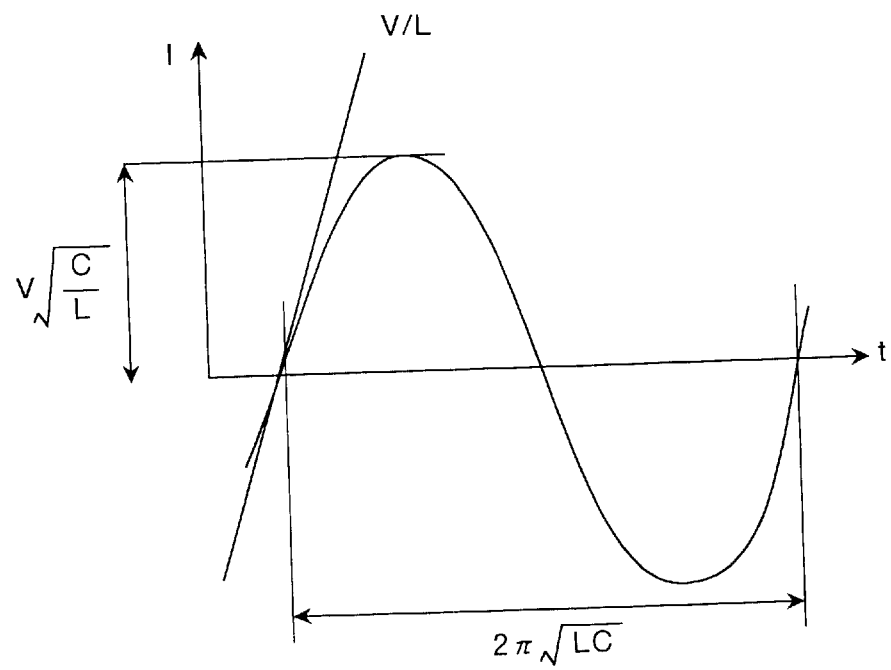
FIG. 7 is a waveform diagram that shows an operation example of the equivalent circuit shown in FIG. 6.

Next, referring to an equivalent circuit diagram in FIG. 6 and a waveform diagram in FIG. 7, an explanation will be further given of the waveform shape of the processing current "Ipw" in the above-mentioned initial processing period, mid processing period and last processing period.

First, when a pole-to-pole voltage (arc voltage) during a discharge is ignored, the circuit of the discharge processing device 1a can be simplified during the initial processing period shown in FIG. 3 so that it is considered to be equivalent to a resonance circuit 8a between the capacitor 2 as shown in FIG. 6 and a floating reactor "L" due to wiring. Therefore, supposing that the initial voltage appearing across the two ends of the capacitor 2 is "V", the processing current "Ipw" flowing between the capacitor 2 and the floating reactor "L" is represented by a function having a cycle of $2\pi(LC)^{1/2}$ with a peak value of $V \times (C/L)^{1/2}$ as indicated by the following equation.

$$\omega = \frac{1}{(LC)^{1/2}} \quad (1)$$

$$Ipw = \omega CV\sin(\omega t) \quad (2)$$

Moreover, the proximity of a rising portion of the processing current "Ipw" is represented by the differential equation (2) of the above-mentioned function at the time of "t=0". Therefore, the value is given by the following equation (4):

$$\begin{aligned}\frac{dIpw}{dt} &= \frac{d\{\omega CV\sin(\omega t)\}}{dt} \\ &= \omega^2 CV\cos(\omega t) \\ &= \frac{1}{LC}CV\cos\left\{\frac{1}{(LC)^{1/2}}t\right\} \\ &= \frac{V}{L}\cos\left\{\frac{1}{(LC)^{1/2}}t\right\}\end{aligned} \quad (3)$$

$$\frac{dIpw}{dt} = \frac{V}{L} \quad (4)$$

In other words, it forms a current waveform shown in FIG. 7 that rises with a gradient of "V/L" and has a peak value "V×(C/L)$^{1/2}$" in the proximity of "π/2×(LC)$^{1/2}$". Thus, it is clearly understood that by increasing only the terminal voltage of the capacitor 2, the rising rate of the processing current "Ipw" is increased.

Moreover, in the mid processing period, the current is allowed to increase with the gradient of "v/L" derived from the floating reactor "L" possessed by cables, etc. and the dc voltage "v" of the first dc power supply 3. Here, with respect to the value of the arc voltage that has been ignored for convenience of explanation, when the arc voltage is virtually coincident with the dc voltage "v" of the first dc power supply 3, it is possible to obtain a current waveform having a flat shape without a rise.

In other words, supposing that the arc voltage is "v'", the following differential equation is satisfied:

$$L\frac{dI}{dt} = V - V' \quad (5)$$

Therefore, when "v=v'" is satisfied, a constant current is obtained. In this case, the arc voltage "v'" is set to approximately 50 V±30 V, although slightly varied depending on processing conditions.

Moreover, in the last processing period, the peak current obtained at the last of the mid processing period is allowed to flow into the capacitor 2 to increase the energy "1/2CV$^2$" of the capacitor 2 by the energy corresponding to the induced energy "1/2LI$^2$" accumulated in the floating reactors "L$_1$" and "L$_2$". Therefore, the terminal voltage of the capacitor 2 is increased until the relationship represented by the following equation has been satisfied.

$$\frac{1}{2}LI^2 = \frac{1}{2}CV^2 \quad (6)$$

In this case, immediately after the start of a processing operation, although no terminal voltage appears on the two ends of the capacitor 2, the peak current increases because of pulses that have been applied thereto several times, resulting in an increase in the capacitor 2. Then, finally, a constant state is maintained so that the above-mentioned processing current "Ipw" is obtained; thus, the waveform of the processing current "Ipw" is formed into a virtually rectangular shape with a simplified circuit construction, thereby making it possible to improve the processing efficiency. Thereafter, the above-mentioned operation is executed repeatedly so that the discharge processing operation is carried out.

Next, referring to FIG. 1 to FIG. 7 and FIG. 30 and FIG. 31, an explanation will be given so as to clarify the distinction between the above-mentioned discharge processing device 1a and a discharge-processing device disclosed in a conventional technique.

Figure 30:
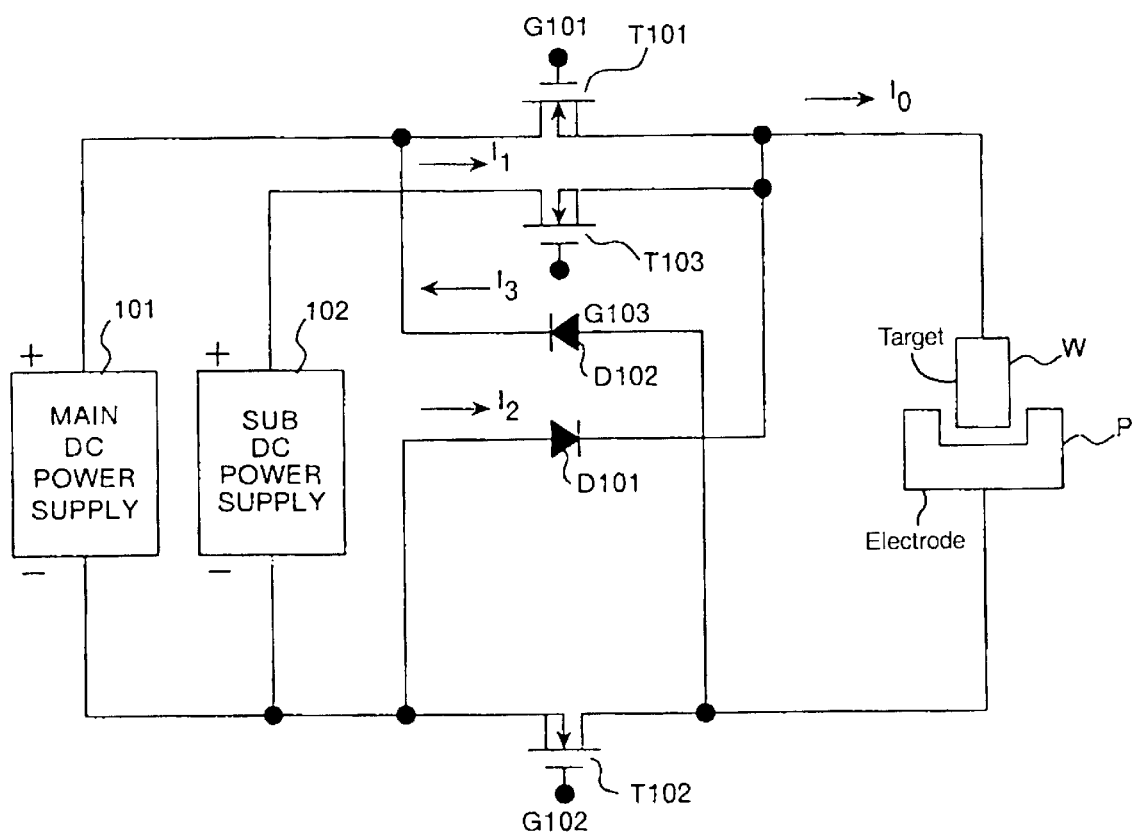
FIG. 30 is a block diagram that shows a circuit construction of a discharge processing device disclosed in Japanese Laid-Open Patent Application No. 11-48039.

First, in the conventional technique shown in FIG. 30, a dc voltage output from a sub dc power supply 102 is used as a voltage to be applied during the initial processing period. Therefore, in addition to a switching element T101 for applying a high voltage used for the initial processing period, it is necessary to install a switching element T103 for applying a low voltage used for the initial and mid processing periods.

Moreover, the border between the initial processing period and the mid processing period is realized by a forced completion, that is, by forcefully turning off the switching element T101. Therefore, a current continues to flow from the main dc power supply 101 until the switching element T101 has been completely turned off, resulting in a great loss in the switching element T101.

In contrast, in the case of the present first embodiment, even if the first switching element 4 has been kept on, the diode 6 is switched from the off state to the on state when the current controlled by the capacitor 2 has been consumed, so that a shift is naturally made from the initial processing period to the mid processing period; thus, no loss exists in the first switching element 4. Moreover, with respect to the recovering operation in the last processing period, in the case of the conventional technique shown in FIG. 30, the recovery is made from the electric potential of the main dc power supply 101, with the result that the voltage value instantaneously jumps up beyond the dc voltage of the main dc power supply 101; consequently, it is necessary to use a switching element having a high voltage resistant property as the switching element T101.

In contrast, in the case of the present first embodiment, the recovery is made from the point to which the terminal voltage of the capacitor 2 has been reduced as the dc voltage "v" of the first dc power supply 3, no jumping up is made in the voltage value, thereby making it possible to reduce the voltage resistance in the first switching element 4.

Moreover, with respect to a capacitor generally used as the power supply section, the greater the capacity, the more stable the power supply becomes. In contrast, in the capacitor 2 explained in the present first embodiment, the quantity of a charge is essentially controlled so as to start to apply the processing current "Ipw" during the initial processing period, and different from a capacitor generally used for the power supply, the capacity is determined based upon the equations (1) to (6).

In particular, when an abrupt rise in the current is required as in the case of first embodiment, the capacitor 2 in the current loop is controlled based upon the equations (1) to (6), and the floating reactor "L" in the loop needs to be reduced to a minimum. With this arrangement, it becomes possible to ensure a processing current "Ipw" having an abrupt rising property which can not be obtained by the construction in which a discharging current is directly supplied from the first dc power supply 3, etc.

Moreover, with respect to the floating reactor "L" in the loop, the floating reactors "L$_1$" and "L$_2$", generated at connecting portions between cables as well as between cables and the target W or the electrode P, are predominant, although it is generated from the entire circuit.

With respect to means for reducing the floating reactor "L" in the loop, it is more advantageous to constitute the capacitor 2 by using a plurality of capacitors parallel connected than to constitute the capacitor 2 by using only one capacitor. Moreover, by designing the circuit substrate so as to distribute the respective parts in a dispersed manner, the floating reactor "L" in the loop can be reduced so that it is possible to ensure a rapid rising property in the current.

In this manner, in the first embodiment, upon carrying out a processing operation on the target W, the charge accumulated in the capacitor 2 is first used to allow the processing current "1pw" having a sharp rising property to flow between the target W and the electrode P; thereafter, the output voltage of the capacitor 2 drops to a constant voltage value preliminarily set, and when the diode 6 is turned on, the dc voltage of the first dc power supply 3 is used to allow the processing current "1pw" to flow between the target W and the electrode P, and after a lapse of a predetermined time in this state, the current supply using the dc voltage of the first dc power supply 3 is stopped, and while the induced electromotive voltage induced in the floating reactors "$L_1$" and "$L_2$" are used to charge the capacitor 2, the processing current "Ipw" flowing between the target W and the electrode P is rapidly reduced so that only the difference voltage between the dc voltage of the first dc power supply 3 and the terminal voltage of the capacitor 2 is applied to the first switching element 4. Therefore, this arrangement makes it possible to reduce the voltage resistance and capacity of the first switching element 4, and consequently to reduce the costs of the entire device, and also makes it possible to simplify the adjustments of the peak value and the processing pulse width of the processing current "Ipw", to provide abrupt rising and falling portions in the processing current "Ipw", and consequently to improve the discharge processing efficiency. Moreover, the number of the first switching elements 4 in FIG. 1 is made smaller than that of the second switching elements 5.

Moreover, in the first embodiment, without the need of on/off controls of the first switching element 4 using a switching element drive circuit, etc., when the value of the terminal voltage output from the capacitor 2 becomes virtually equal to a voltage value (dc voltage in the first dc power supply 3) preliminarily set, this fact is detected by the diode 6 and the processing current "Ipw" used for the mid processing period is allowed to flow between the target W and the electrode P. Therefore, a shift is made from the initial processing period to the mid processing period without giving a load to the driving circuit, etc. for the switching elements, and this arrangement makes it possible to provide abrupt rising and falling portions in the discharge processing current waveform while simplifying the control sequence and the adjustments, etc. of the peak value and the processing pulse width of the discharge processing current; thus, it becomes possible to improve the discharge processing efficiency.

Figure 8:
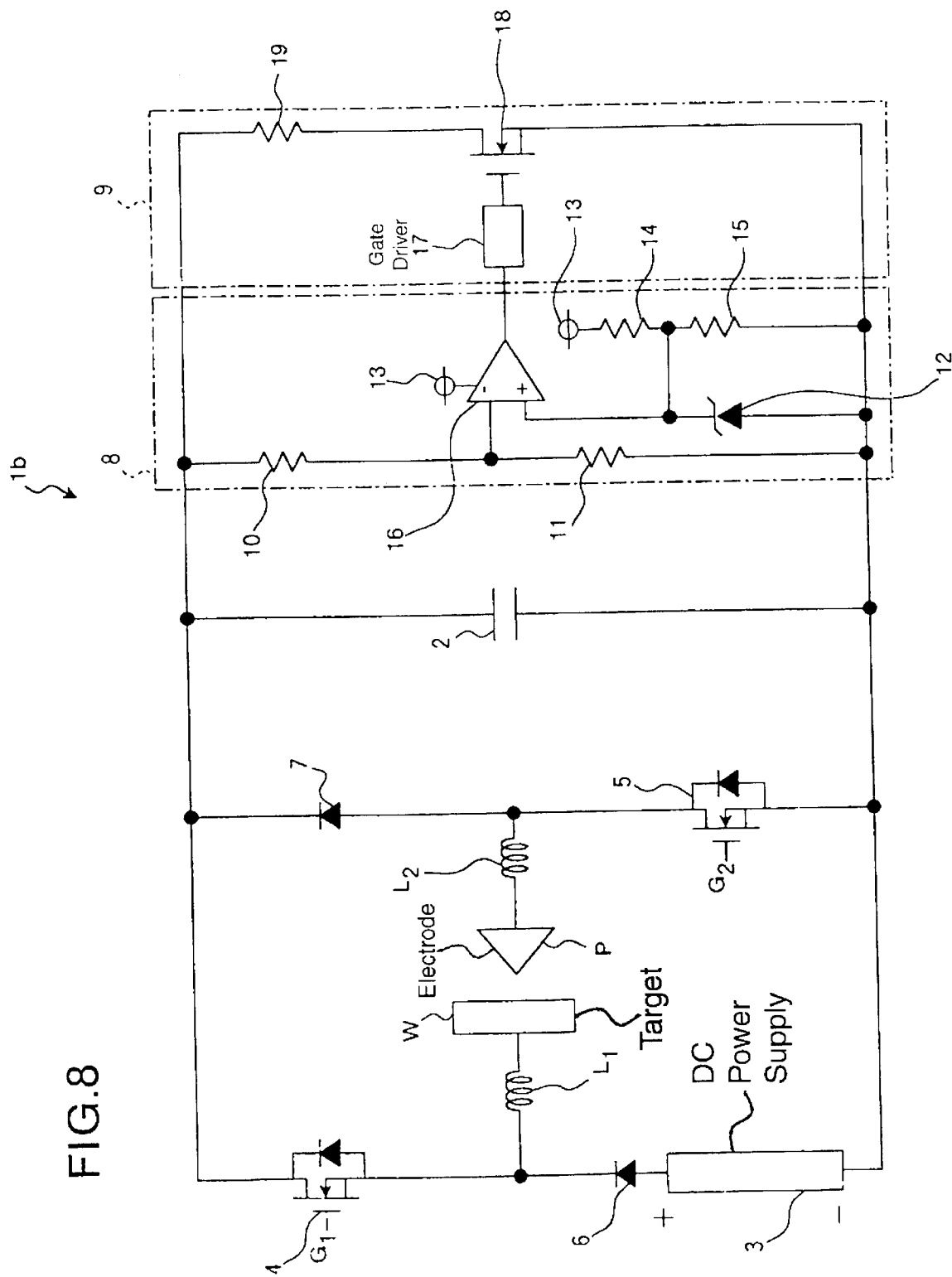
FIG. 8 is a block diagram that shows a discharge processing device in accordance with a second embodiment of the present invention.

The discharge processing device in accordance with the second embodiment of the present invention is shown in FIG. 8. The components that perform the same functions as those shown in FIG. 1 are provided with the same reference numbers.

A discharge processing device 1b shown in FIG. 8 is different from the discharge processing device 1a shown in FIG. 1 in that there are installed a voltage judgment circuit 8 for comparing the terminal voltage of the capacitor 2 with a predetermined reference voltage value and a voltage limiter circuit 9 for limiting the terminal voltage rise of the capacitor 2 based upon the results of the judgment of the voltage judgment circuit 8. With this arrangement, even if there are variations in energy recovered in the last processing period due to the state of discharging and the controlling method, the quantity of charge stored in the capacitor 2 is maintained unchanged so as to prevent the waveform shape of the processing current "Ipw" in the next cycle from changing, thereby making it possible to carry out an accurate controlling operation.

The voltage judgment circuit 8 is provided with two resistors 10 and 11 for dividing the terminal voltage of the capacitor 2, a constant voltage diode 12 for generating a predetermined voltage (constant voltage) upon receipt of a current having a value not less than a predetermined value, two resistors 14 and 15 for voltage-dividing a power supply voltage supplied from a power supply line 13 and for applying the resulting voltage to the constant voltage diode 12 so as to generate a constant voltage, and a comparator 16 which compares the output voltage of the capacitor 2 voltage-divided by the resistors 10 and 11 with the predetermined voltage (reference voltage) generated by the constant voltage diode 12, and when the output voltage side of the capacitor 2 becomes higher than the reference voltage, outputs a charging stop signal ("Low" signal), and in this arrangement, the divided voltage obtained by voltage-dividing the terminal voltage of the capacitor 2 is compared with the predetermined reference voltage, and when the divided voltage of the capacitor 2 is lower than the reference voltage, a "Hi" signal is generated and supplied to the voltage limiter circuit 9, and when it is higher than the reference voltage, a "Low" signal is generated, and supplied to the voltage limiter circuit 9.

The voltage limiter circuit 9 is constituted by a gate driver element 17 which, in the case of "Low" signal from the comparator 16, generates a gate-off signal, and in the case of "High" signal from the comparator 16, generates a gate-in signal; a switching element 18 which, upon receipt of the gate-off signal from the gate driver element 17, opens the two ends of the capacitor 2 so as to allow the output voltage to rise, and upon receipt of the gate in signal from the gate driver element 17, short-circuits the two ends of the capacitor 2 so as to prevent the output voltage of the capacitor 2 from rising; and a resistor 19 which, when the switching element 18 allows the two ends of the capacitor 2 to short-circuit, limits the short-circuiting current so as to prevent the output voltage of the capacitor 2 from dropping lower than necessary, and in this arrangement, when "High" signal is output from the comparator 16, the two ends of the capacitor 2 are opened so as to allow the output voltage to rise, and when "Low" signal is output from the comparator 16, the two ends of the capacitor 2 are short-circuited so as to drop the output voltage of the capacitor 2 to a predetermined level.

In this manner, in the second embodiment, the switching element driving circuit (not shown) allows the first switching element 4 and the second switching element 5 to operate in the same manner as the first embodiment so that the processing current "Ipw" having sharp rising and falling portions is allowed to flow between the target W and the electrode P, and even when the instantaneous current waveform shape is changed due to a change in the discharging condition, etc. of the capacitor 2, the quantity of a charge accumulated in the capacitor 2 is adjusted so that a charge having a quantity greater than necessary is not accumulated in the capacitor 2. Therefore, it is possible to prevent disturbances in a processing current waveform of the next cycle and thereafter and consequently to provide an accurate control, so that it becomes possible to use the first switching element 4 having a low voltage resistance and a low capacity so as to reduce the costs of the entire device, to simplify the adjustments of the peak value of the processing current "Ipw" and the processing pulse width thereof, to provide abrupt rising and falling portions of the processing current waveform, and consequently to improve the discharge processing efficiency.

Figure 9:
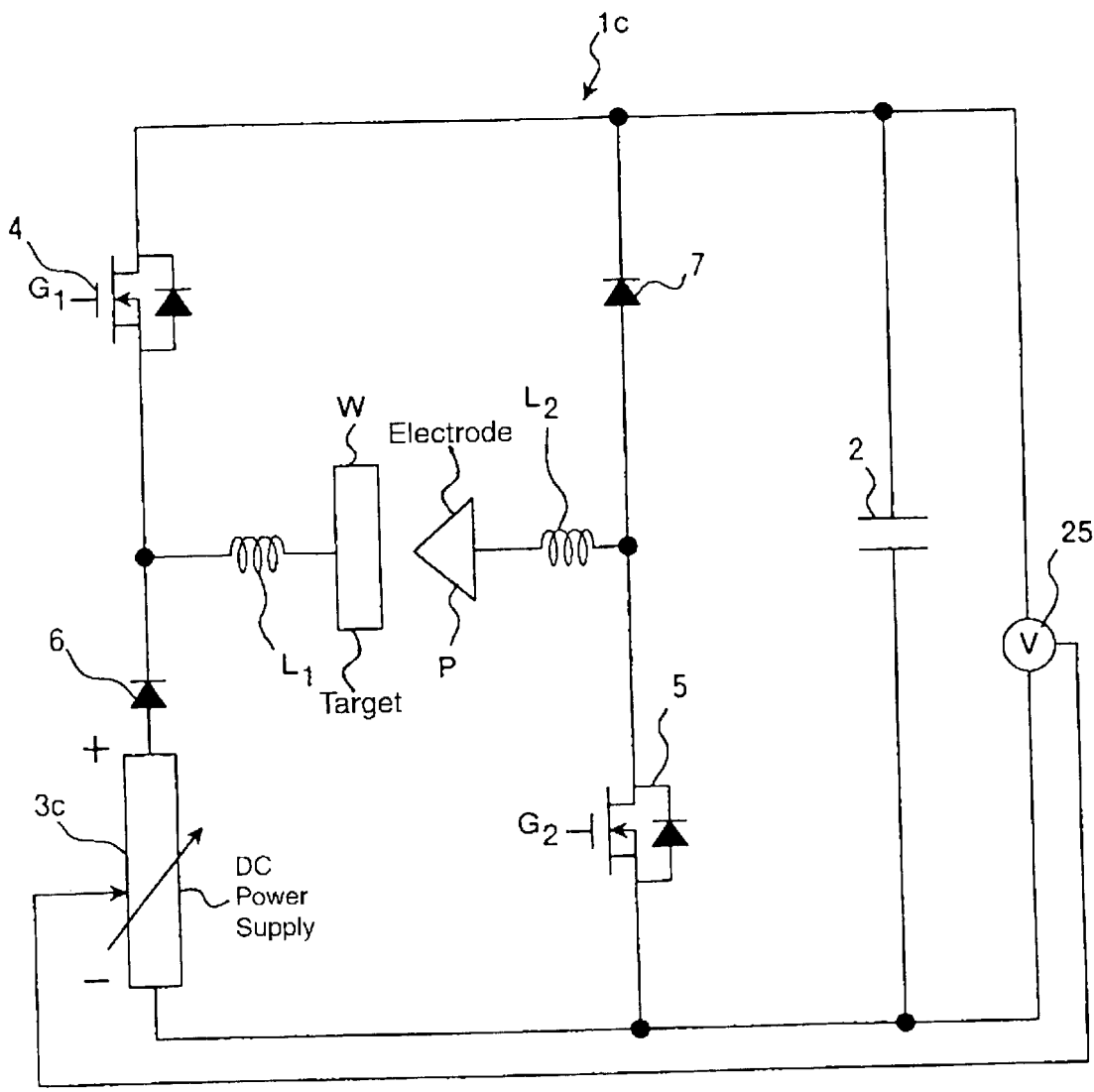
FIG. 9 is a block diagram that shows a discharge processing device in accordance with a third embodiment of the present invention.

The discharge processing device in accordance with the third embodiment of the present invention is shown in FIG. 9. The components that perform the same functions as those shown in FIG. 1 are provided with the same reference numbers.

A discharge processing device 1c shown in FIG. 9 is different from the discharge processing device 1a shown in FIG. 1 in that there are installed a voltage monitoring circuit 25 for monitoring the terminal voltage of the capacitor 2 and a first dc power supply 3c of a variable voltage type that is placed instead of the first dc power supply 3 of the fixed voltage type, and in this arrangement, when the terminal voltage of the capacitor 2 becomes higher than a predetermined reference voltage value, the voltage monitoring circuit 25 detects this fact, and reduces the value of the dc voltage output from the first dc power supply 3c so that, even when there are variations in energy recovered in the last processing period due to the state of discharging and the controlling method, the quantity of charge stored in the capacitor 2 is maintained unchanged so as to prevent the current waveform shape in the next cycle from changing, thereby making it possible to carry out an accurate controlling operation.

In this manner, in the third embodiment, the switching element driving circuit (not shown) allows the first switching element 4 and the second switching element 5 to operate in the same manner as the first embodiment so that the processing current "Ipw" having sharp rising and falling portions is allowed to flow between the target W and the electrode P, and even when the instantaneous current waveform shape is changed due to a change in the discharging condition, etc. of the capacitor 2, the value of the dc voltage output from the first dc power supply 3c is adjusted so as to maintain energy to be stored in the capacitor 2 at a constant value. Therefore, it is possible to prevent disturbances in a processing current waveform of the next cycle and thereafter and consequently to provide an accurate control, so that it becomes possible to use the first switching element 4 having a low voltage resistance and a low capacity so as to reduce the costs of the entire device, to simplify the adjustments of the peak value of the processing current "Ipw" and the processing pulse width thereof, to provide abrupt rising and falling portions of the processing current waveform, and consequently to improve the discharge processing efficiency.

Figure 10:
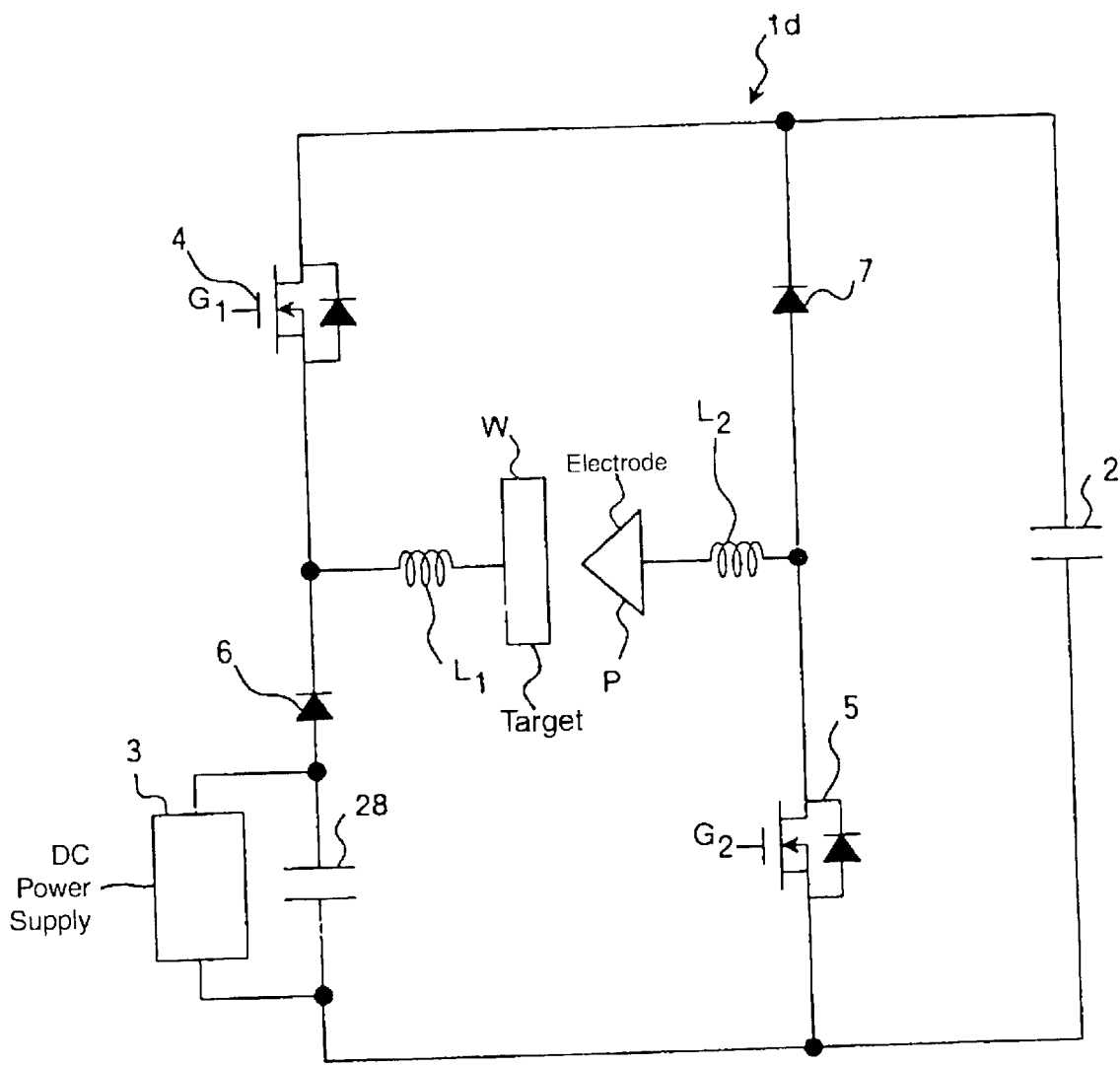
FIG. 10 is a block diagram that shows a discharge processing device in accordance with a fourth embodiment of the present invention.

The discharge processing device in accordance with the fourth embodiment of the present invention is shown in FIG. 10. The components that perform the same functions as those shown in FIG. 1 are provided with the same reference numbers.

A discharge processing device id shown in FIG. 10 is different from the discharge processing device 1a shown in FIG. 1 in that a capacitor 28, which has a capacity greater than the capacity of the capacitor 2, is connected in parallel with the first dc power supply 3 so that in the mid processing period, while a current is being supplied directly from the first dc power supply 3, a current is also supplied indirectly from the capacitor 28, so as to allow the processing current Ipw to flow between the target W and the electrode P, thereby making it possible to prevent a reduction in the current supplying rate due to the floating inductance of the first dc power supply 3.

In this manner, in the fourth embodiment, while the charge accumulated in the capacitor 28 is allowed to prevent a reduction in the output voltage of the first dc power supply 3, the switching element driving circuit (not shown) operates the first switching element 4 and second switching element 5 in the same manner as the first embodiment, so that a processing current "Ipw" having sharp rising and falling portions is allowed to flow between the target W and the electrode P. Therefore, even when floating inductance components are contained in the first dc power supply 3, the current supply through the capacitor 28, which is free from inductance components, is available, thereby making it possible to prevent a reduction in the current supplying rate, that is, the rising rate of the processing current "Ipw".

Moreover, in the fourth embodiment, the capacity of the capacitor 28 is made greater than the capacity of the capacitor 2 so that during the last processing period, a current is fed back from the capacitor 28 to the capacitor 2 so as to sufficiently increase the terminal voltage of the capacitor 2.

Figure 11:
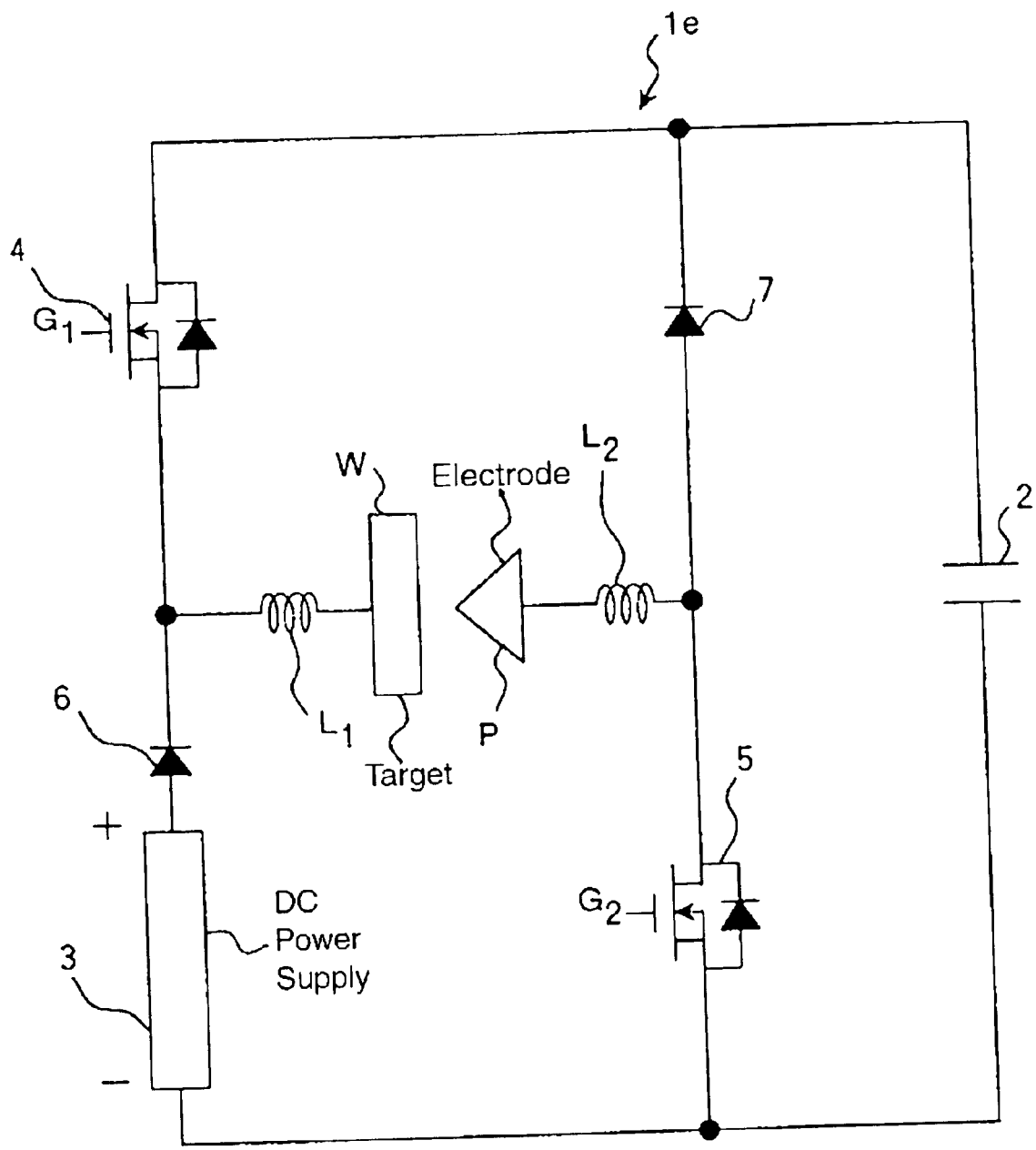
FIG. 11 is a block diagram that shows a discharge processing device in accordance with a fifth embodiment of the present invention.

The discharge processing device in accordance with the fifth embodiment of the present invention is shown in FIG. 11. The components that perform the same functions as those shown in FIG. 1 are provided with the same reference numbers.

Figure 12:
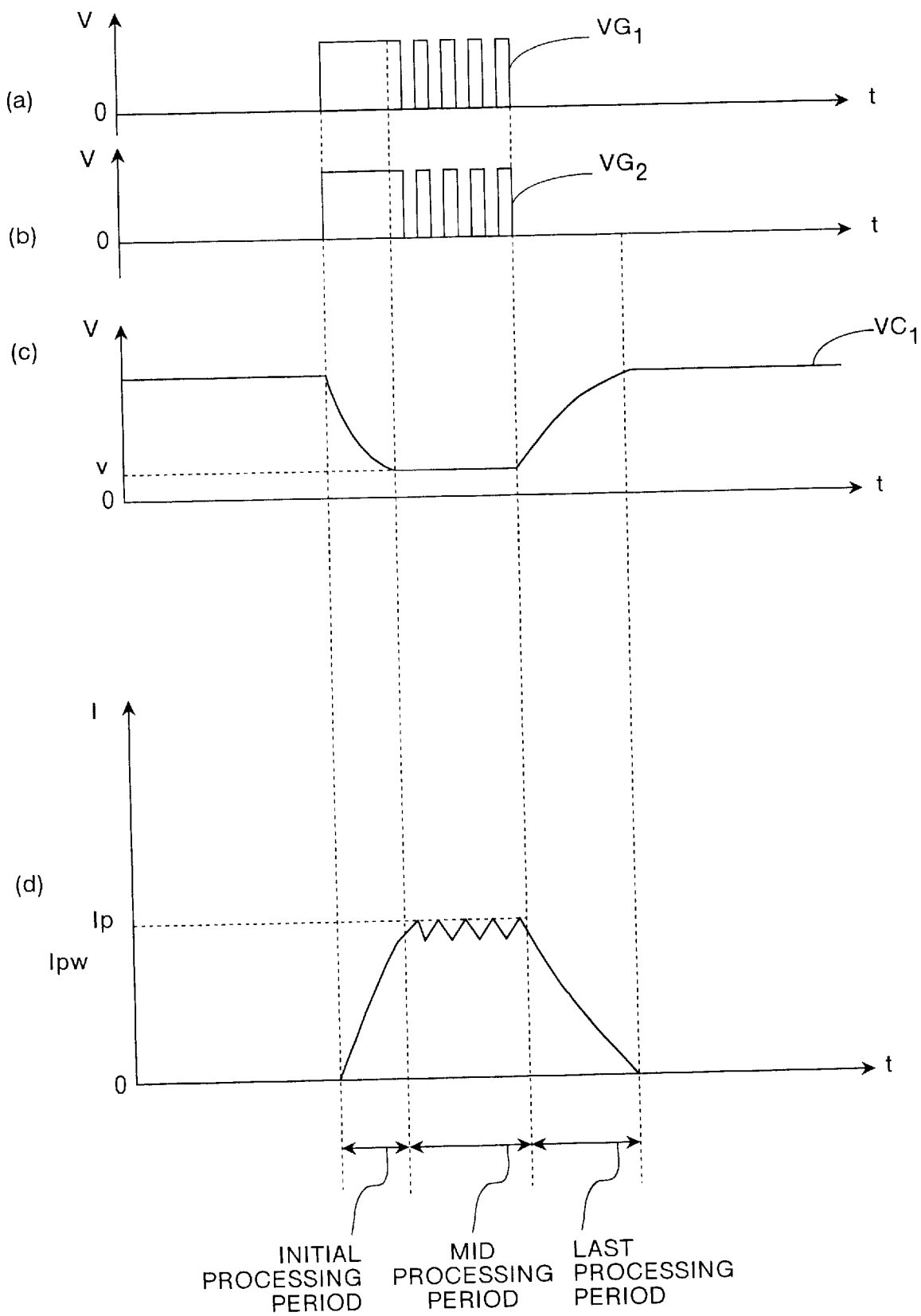
FIG. 12 is a waveform diagram that shows an operation example of the discharge processing device shown in FIG. 11.

A discharge processing device 1e shown in FIG. 11 is different from the discharge processing device 1a shown in FIG. 1 in the following points: as illustrated by (a) and (b) in FIG. 12, during the initial processing period, rectangular pulses "$VG_1$" and "$VG_2$" are output from the switching element driving circuit (not shown) so as to allow the capacitor 2 to discharge as illustrated by (c) in FIG. 12. Thus, as illustrated by (d) in FIG. 12, an abrupt rising portion is provided in the processing current "Ipw" flowing between the target W and the electrode P, and during the mid processing period, the pulses "$VG_1$" and "$VG_2$" output from the switching element driving circuit (not shown) are turned on/off several times so that the second switching element 5 is on/off-controlled so as to reduce the peak current of the processing current "Ipw".

In this manner, in the fifth embodiment, during the initial processing period, both of the first switching element 4 and the second switching element 5 are turned on, and in the mid processing period, the first switching element 4 and the second switching element 5 are turned on/off so that a processing current "Ipw" which has abrupt rising and falling portions and becomes flat during the mid processing period is allowed to flow between the target W and the electrode P. Therefore, even when, upon processing the target W, there is a drop in the arc voltage, or there is a variation in the voltage value of the output voltage "v" from the first dc power supply 3, it is possible to prevent an increase in the processing current "Ipw" in the mid processing period, consequently to prevent the current peak from becoming greater than necessary, and also to make the processing current waveform into a rectangular shape.

With this arrangement, in the fifth embodiment, even when the arc voltage is low, the processing current waveform is maintained virtually at a rectangular shape. Therefore, it becomes possible to improve the discharge processing efficiency, to use the first switching element 4 having a low voltage resistance and a low capacity so as to reduce the costs of the entire device, and consequently to simplify the adjustments of the peak value and the processing pulse width of the discharge processing current.

Moreover, in the fifth embodiment, the switching element driving circuit of the discharge processing device 1a shown in FIG. 1 is modified so that the pulses "$VG_1$" and "$VG_2$" are turned on/off in the mid processing period; however, each of the switching element driving circuits of the discharge processing devices 1b, 1c and 1d shown in FIG. 8, FIG. 9 and FIG. 10 may be modified so that the pulses "$VG_1$" and "$VG_2$" are turned on/off in the mid processing period.

With these arrangements, in the same manner as described above, even when, upon processing the target, there is a drop in the arc voltage, or there is a variation in the voltage value of the output voltage "v" from the first dc power supply 3, it is possible to prevent an increase in the processing current "Ipw" in the mid processing period, consequently to prevent the current peak from becoming greater than necessary, and also to make the processing current waveform into a rectangular shape.

Moreover, in the fifth embodiment, the number of switching operations in the first switching element 4 and the second switching element 5 during the mid processing period is set to four times; however, this number may be desirably set, and the factors such as the pulse width and pause time may also be desirably set.

Figure 13:
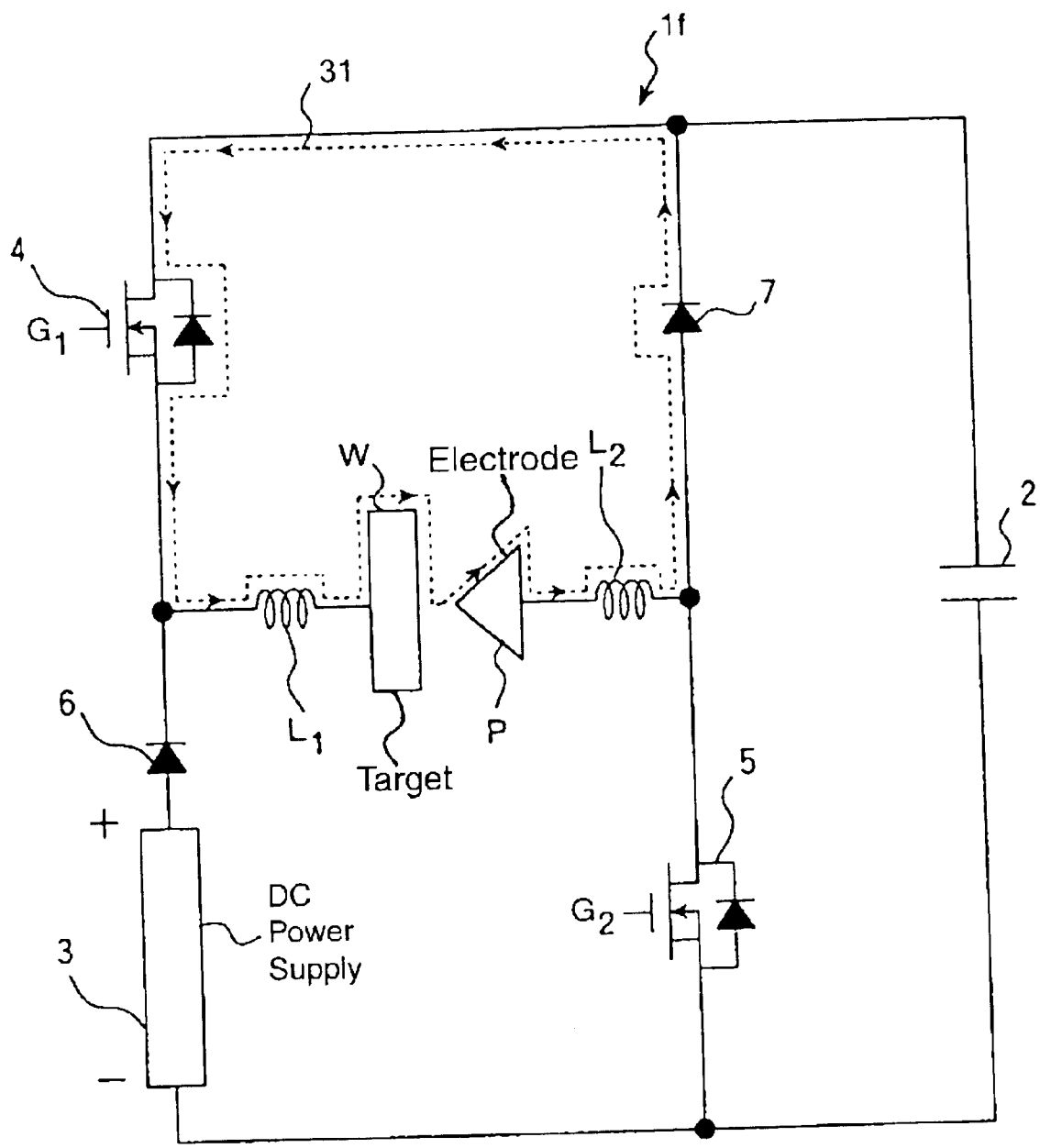
FIG. 13 is a block diagram that shows a discharge processing device in accordance with a sixth embodiment of the present invention.

The discharge processing device in accordance with the sixth embodiment of the present invention is shown in FIG. 13. The components that perform the same functions as those shown in FIG. 1 are provided with the same reference numbers.

Figure 14:
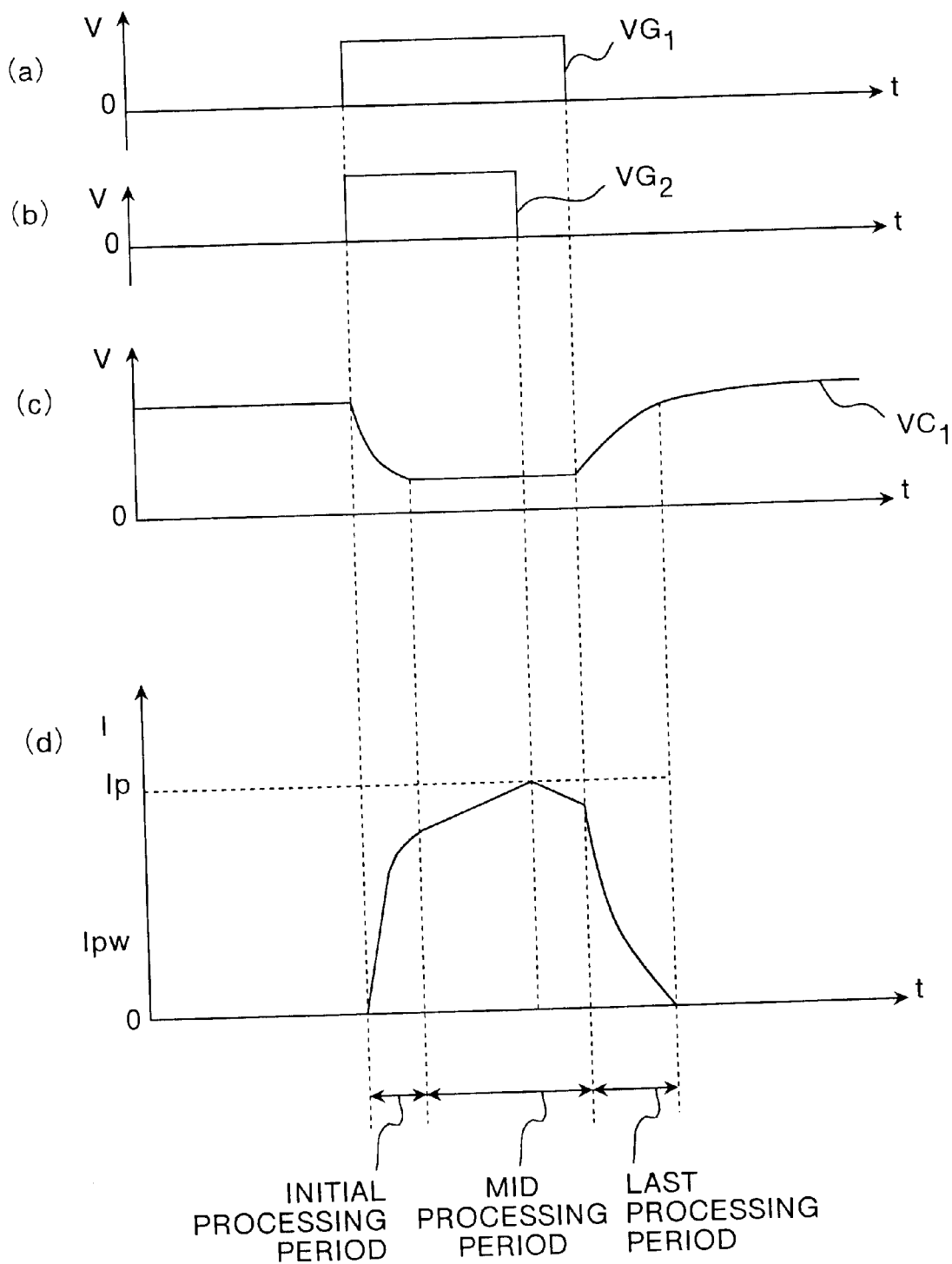
FIG. 14 is a waveform diagram that shows an operation example of the discharge processing device shown in FIG. 13.

A discharge processing device if shown in FIG. 13 is different from the discharge processing device 1a shown in FIG. 1 in the following points: as illustrated in FIGS. 14(a) and (b), during the mid processing period, with the rectangular pulse "$VG_1$" being output from the switching element driving circuit (not shown), the output of the pulse "$VG_2$" is stopped, and as shown by (c) in FIG. 14, prior to starting to charge the capacitor 2, an induced electromotive voltage is induced by induction energy accumulated in floating reactors $L_1$ and $L_2$, and fed back through a loop consisting of: the floating reactor $L_2$ to the diode 7 to the first switching element 4 to the floating reactor $L_1$ to the target W to the electrode P to the floating reactor $L_2$, that is, a loop 31 that does not pass through the first dc power supply 3, so that in the course of the mid processing period, the peak value of the processing current "Ipw" is reduced.

In this manner, in the sixth embodiment, during the initial processing period, both of the first switching element 4 and the second switching element 5 are turned on, and in the course of the mid processing period, with the first switching element 4 being turned on, the second switching element 5 is turned off to reduce the peak value of a processing current "Ipw" so that the processing current "Ipw" which has abrupt rising and falling portions and becomes flat during the mid processing period is allowed to flow between the target W and the electrode P. Therefore, even when, upon processing the target W, there is a drop in the arc voltage, or there is a variation in the voltage value of the output voltage "v" from the first dc power supply 3, it is possible to prevent an increase in the processing current "Ipw" in the mid processing period, consequently to prevent the current peak from becoming greater than necessary, and also to make the processing current waveform into a rectangular shape.

With this arrangement, in the sixth embodiment, even when the arc voltage is low, the processing current waveform is maintained virtually at a rectangular shape. Therefore, it becomes possible to improve the discharge processing efficiency, to use the first switching element 4 having a low voltage resistance and a low capacity so as to reduce the costs of the entire device, and consequently to simplify the adjustments of the peak value and the processing pulse width of the discharge processing current.

Moreover, in the sixth embodiment, the switching element driving circuit of the discharge processing device 1a shown in FIG. 1 is modified so that the pulse "$VG_2$" is turned off in the course of the mid processing period; however, each of the switching element driving circuits of the discharge processing devices 1b, 1c and 1d shown in FIGS. 8, 9 and 10 may be modified so that the pulse "$VG_2$" is turned off in the course of the mid processing period.

With these arrangements, in the same manner as described above, even when, upon processing the target, there is a drop in the arc voltage, or there is a variation in the voltage value of the output voltage "v" from the first dc power supply 3, it is possible to prevent an increase in the processing current "Ipw" in the mid processing period, consequently to prevent the current peak from becoming greater than necessary, and also to make the processing current waveform into a rectangular shape.

Moreover, in the sixth embodiment, the switching element driving circuit of the discharge processing device 1a shown in FIG. 1 is modified so that the pulse "$VG_2$" is turned off in the course of the mid processing period; however, each of the switching element driving circuits of the discharge processing devices 1b, 1c and 1d shown in FIGS. 8, 9 and 10 may be modified so that, with the first switching element 4 being turned on, the switching element 5 is on/off-controlled so that the following two current loops maybe selectively used: one loop consisting of: the floating reactor $L_1$, the target W, the electrode P, the floating reactor $L_2$, the diode 7 and the first switching element 4; and the other loop consisting of: the first dc power supply 3, the floating reactor $L_1$, the target W, the electrode P, the floating reactor $L_2$ and the second switching element 5.

With this arrangement, in the same manner as described above, the peak value of the processing current "Ipw" is reduced in the course of the mid processing period so that it is possible to make the processing current waveform into a rectangular shape, and also to improve the processing rate.

Figure 15:
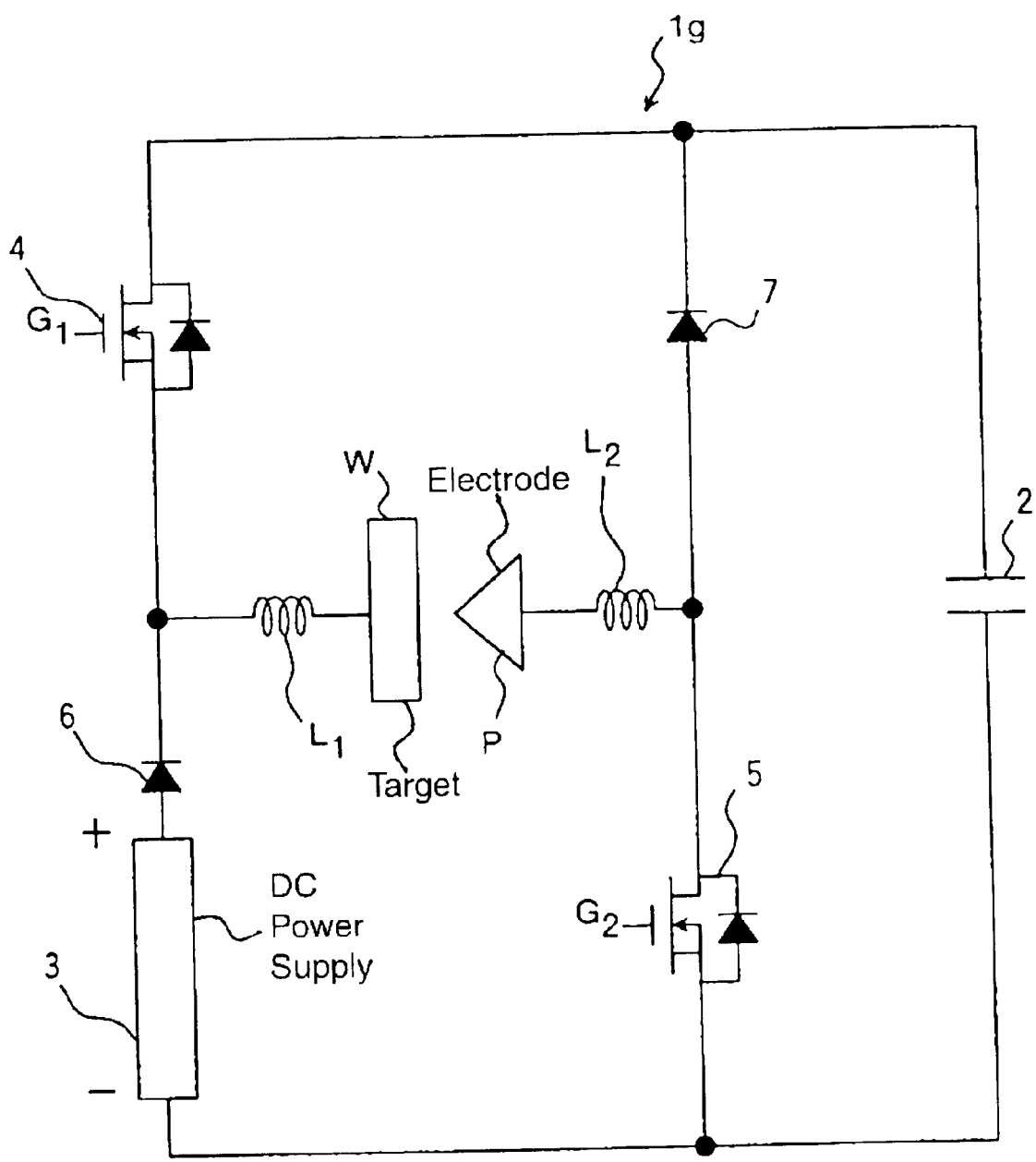
FIG. 15 is a block diagram that shows a discharge processing device in accordance with a seventh embodiment of the present invention.

The discharge processing device in accordance with the seventh embodiment of the present invention is shown in FIG. 15. The components that perform the same functions as those shown in FIG. 1 are provided with the same reference numbers.

A discharge processing device 1g shown in FIG. 15 is different from the discharge processing device 1a shown in FIG. 1 in the following points: as illustrated in FIGS. 16(a) and (b), during the mid processing period, with the rectangular pulse "$VG_2$" being output from the switching element driving circuit (not shown), the output of the pulse "$VG_1$" is stopped, and as shown in FIG. 16(c), prior to complete consumption of the current from the capacitor 2, that is, before the terminal voltage output from the capacitor 2 has been reduced to the voltage value "v" of the dc voltage output from the first dc power supply 3, the first switching element 4 is turned off, and the supply of the current from the first dc power supply 3 is started so that, as shown in FIG. 16(d), the processing current "Ipw", which has a sine waveform determined by the capacitor 2, the floating reactors $L_1$, $L_2$ and the rate of change "dI/dt" of the current output from the capacitor 2, is sharpened at its rising portion.

In this manner, in the seventh embodiment, with a sufficient charge remaining in the capacitor 2, the terminal voltage of the capacitor 2 is increased in the initial processing period so that the smooth portion of "dI/dt" in the sine waveform is eliminated, thereby allowing the processing current "Ipw" to abruptly rise as compared with that of the discharge processing device 1a of FIG. 1. Therefore, as clearly shown by the equations (1) to (6), by adjusting the capacity value of the capacitor 2 or the floating reactors $L_1$, $L_2$ of the wiring, the peak current and processing pulse width can be easily adjusted, and a switching element having a lower voltage resistance and lower capacity can be used as the first switching element 4 so that it becomes possible to reduce the costs of the entire device.

Figure 16:
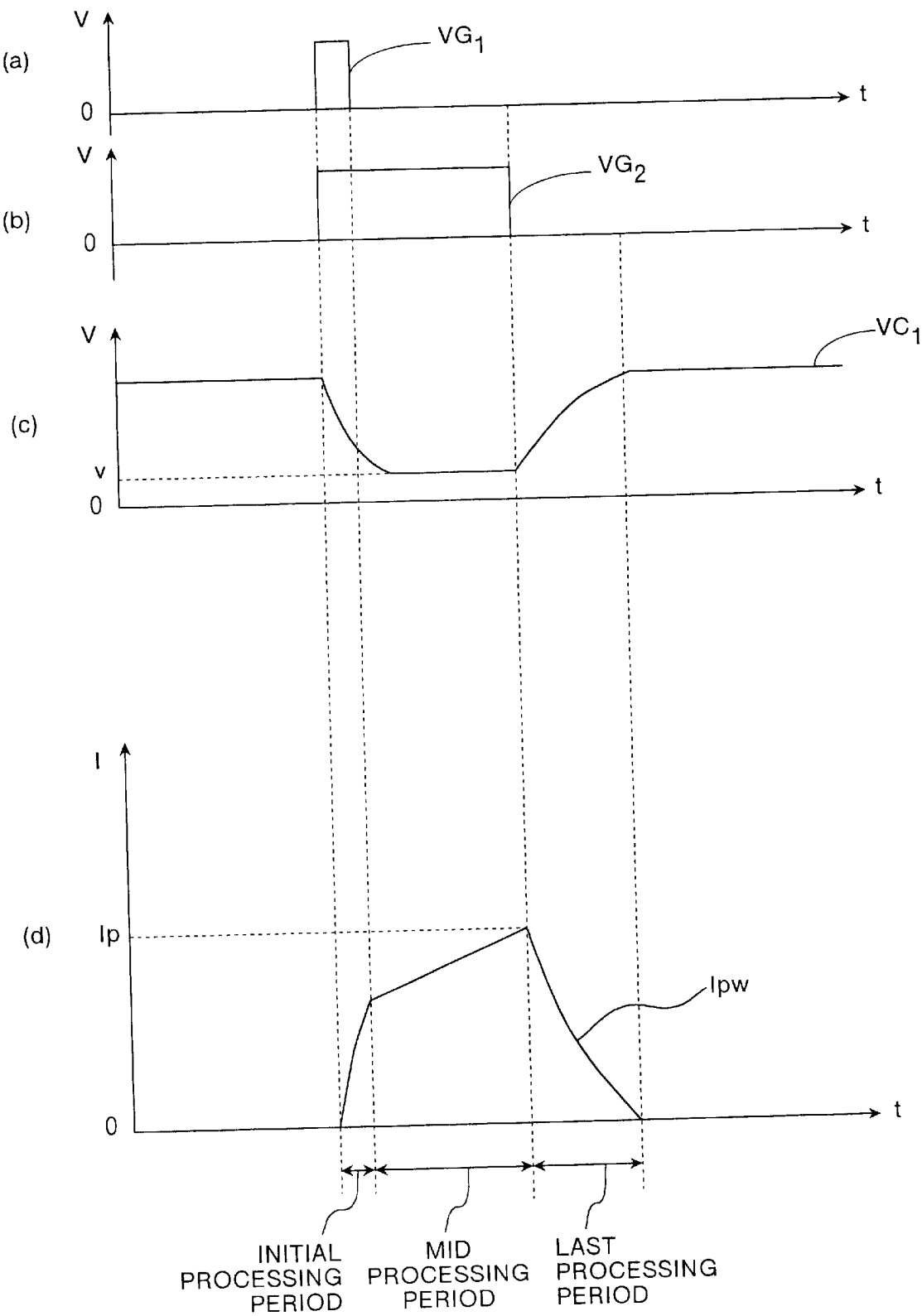
FIG. 16 is a waveform diagram that shows an operation example of the discharge processing device shown in FIG. 15.

Here, in the seventh embodiment, although the loss of the first switching element 4 becomes slightly greater as compared with the discharge processing device 1a shown in FIG. 1, the terminal voltage of the capacitor 2 is reduced at the border between the initial processing period and the mid processing period as shown by (c) in FIG. 16. Therefore, different from the conventional techniques shown in FIG. 30 and FIG. 31 in which a current is supplied from the main dc power supply 101, the loss of the device can be reduced greatly.

Moreover, in the seventh embodiment, the switching element driving circuit of the discharge processing device 1a shown in FIG. 1 is modified so that, with the pulse "VG$_2$" from the switching element driving circuit being outputted, the output of the pulse "VG$_1$" is stopped in the initial processing period; however, each of the switching element driving circuits of the discharge processing devices 1b, 1c and 1d shown in FIG. 8, FIG. 9 and FIG. 10 may be modified so that, with the first switching element 4 being turned on, the output of the pulse "VG$_1$" may be stopped with the pulse "VG$_2$" from the switching element driving circuit being output in the initial processing period.

With these arrangements, in the same manner as described above, it is possible to provide an abrupt rising portion in the initial processing period, and by adjusting the capacity value of the capacitor 2 or the floating reactors L$_1$, L$_2$ of the wiring, the terminal voltage of the capacitor 2 is increased in the initial processing period with a sufficient charge remaining in the capacitor 2, thereby making it possible to sharpen the rising portion of the processing current "Ipw".

Figure 17:
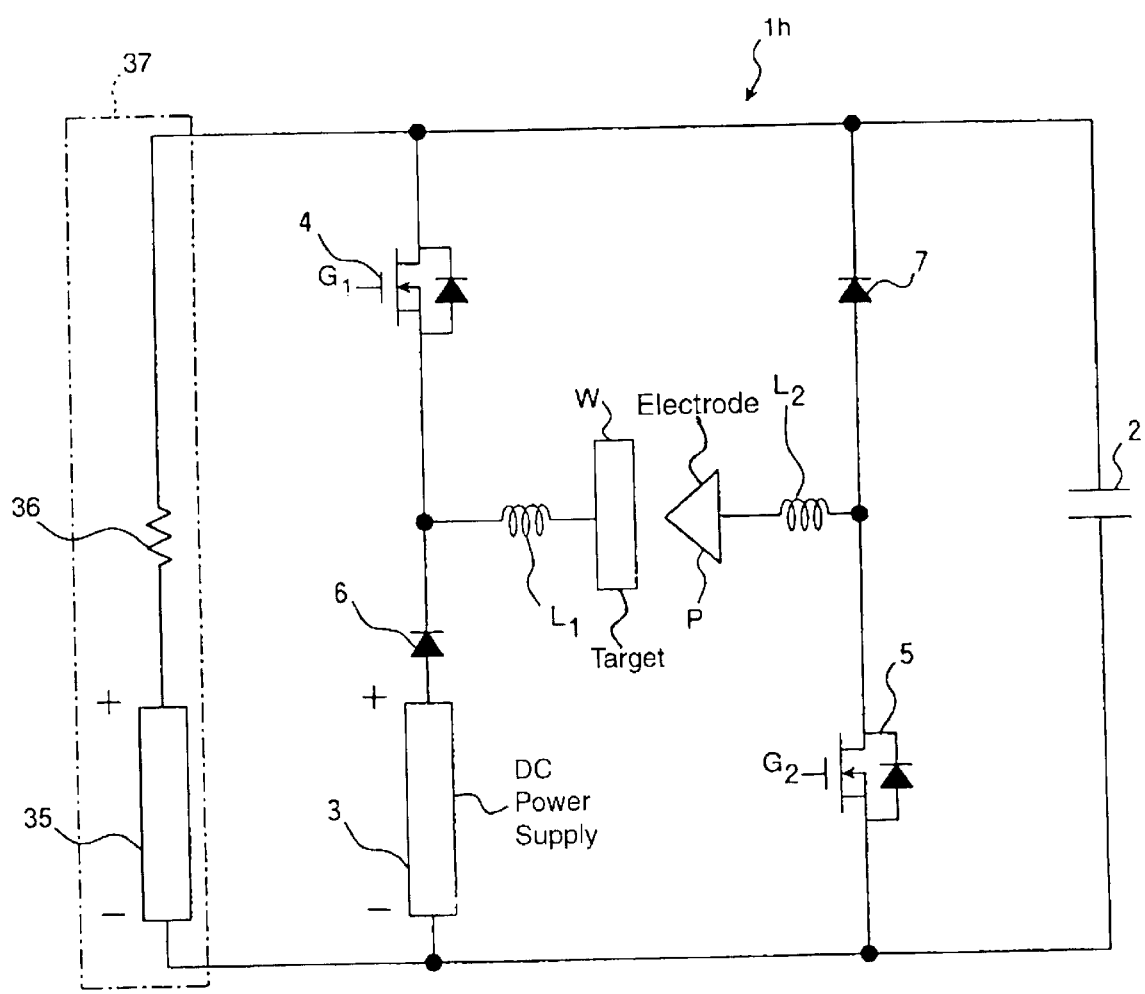
FIG. 17 is a block diagram that shows a discharge processing device in accordance with an eighth embodiment of the present invention.

The discharge processing device in accordance with the eighth embodiment of the present invention is shown in FIG. 17. The components that perform the same functions as those shown in FIG. 1 are provided with the same reference numbers.

A discharge processing device 1h shown in FIG. 17 is different from the discharge processing device 1a shown in FIG. 1 in that there is provided a preliminary charging circuit 37 having a second dc power supply 35 for outputting an output voltage higher than that of the first dc power supply 3, prior to starting a processing operation on the target W and a resistor 36 for supplying the current output from the second dc power supply 35 to the capacitor 2 while controlling the value of the current, so as to preliminarily charge this, and in this arrangement, prior to starting the processing operation on the target W, the capacitor 2 is preliminarily charged by the preliminary charging circuit 37 so that the same charge as in the case of a constant state of the capacitor 2 is accumulated therein; thus, provision is made so as not to allow the processing current "Ipw" to form a triangular waveform, even immediately after the start of the processing operation.

In this manner, in the eighth embodiment, when, prior to starting the processing operation on the target W, a sufficient charge has not been accumulated in the capacitor 2, the dc voltage is output from the positive terminal of the second dc power supply 35 of the preliminary charging circuit 37 so that a current is allowed to flow through a loop consisting of: the positive terminal of the second dc power supply 35 to the resistor 36 to the capacitor 2 to the negative terminal of the second dc power supply 35, thereby charging the capacitor 2; thereafter, the switching element driving circuit (not shown) operates the first switching element 4 and the second switching element 5 in the same manner as the first embodiment so that a processing current "Ipw" having sharp rising and falling portions is allowed to flow between the target W and the electrode P. Therefore, even in several cycles from the just start of the processing operation to the constant state, which is an essential period in processing the target W, the initial charge is accumulated in the capacitor 2 so as to prevent the processing current "Ipw" from having a triangular waveform, thereby maintaining a stable virtually rectangular shaped current immediately after the start of the processing operation and improving the processing efficiency; consequently, it becomes possible to use the first switching element 4 having a low voltage resistance and a low capacity so as to reduce the costs of the entire device, to simplify the adjustments of the peak value of the processing current "Ipw" and the processing pulse width thereof, to provide abrupt rising and falling portions of the processing current waveform, and consequently to improve the discharge processing efficiency.

Moreover, in the eighth embodiment, the resistor 36 is series-connected to the second dc power supply 35, therefore, even when any inductance exists due to the wiring in the vicinity of the second dc power supply 35, the Q value of a resonance circuit constituted by this inductance and the capacitor 2 may be reduced so as to reduce the oscillation so that it becomes possible to eliminate jumping up of the voltage and consequently to stabilize the circuit operation.

The second dc power supply 35 in the present embodiment is essentially provided as an additional device for charging the capacitor 2. Therefore, it is not preferable to provide a structure in which, in the initial processing period, a current is allowed to flow from the second dc power supply 35 to the target W and the electrode P through the first switching element 4. Moreover, it is not preferable to provide a structure in which, in the last processing period, a recovered current is allowed to flow into the second dc power supply 35.

Figure 31:
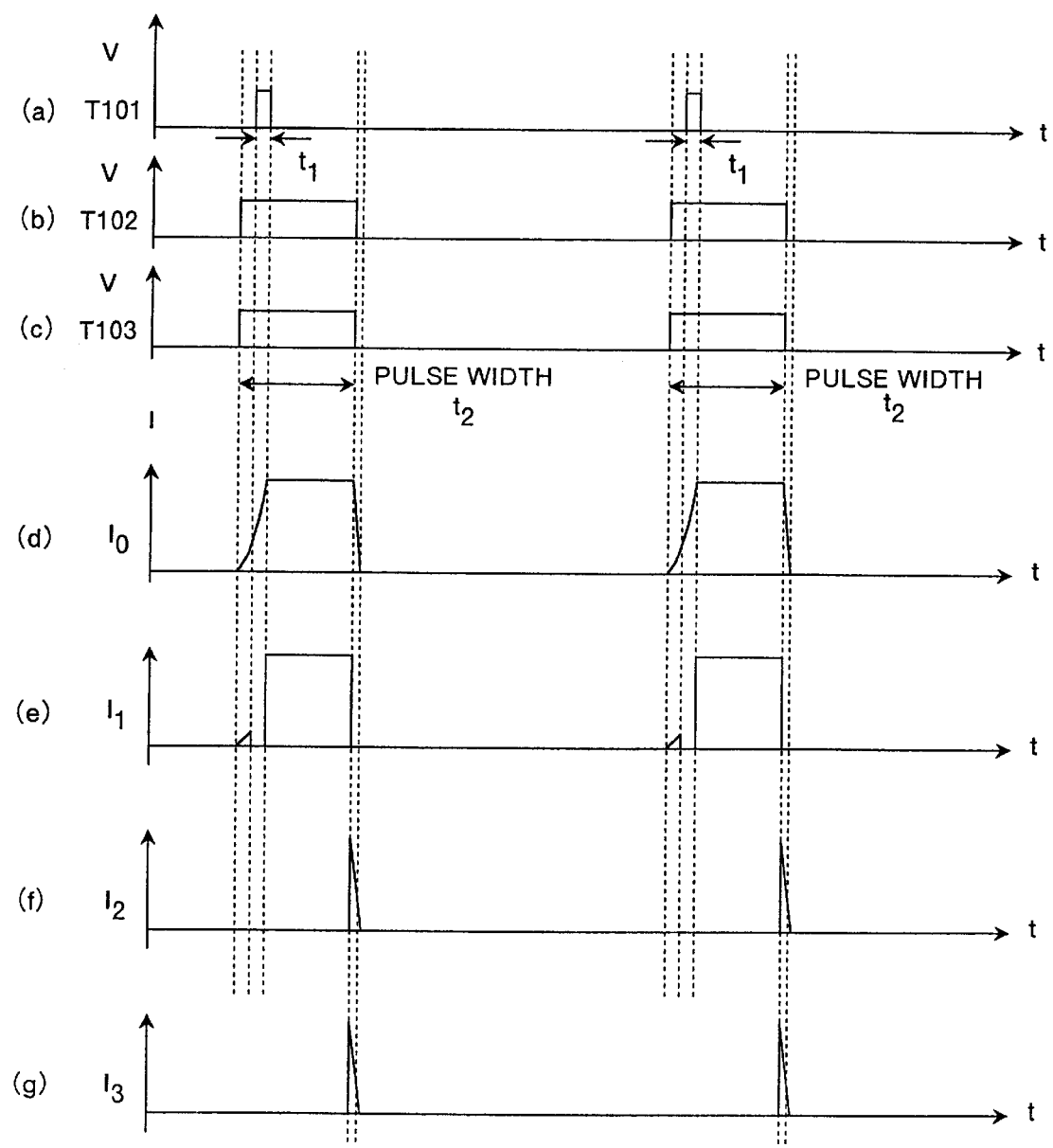
FIG. 31 is a waveform diagram that shows an operation example of the discharge processing device shown in FIG. 30.

In other words, the distinction over the conventional techniques shown in FIGS. 30 and 31 essentially lies in the fact that currents (charges) are transmitted and received with the capacitor 2 serving as a base point, and after having supplied the initial voltage to the capacitor 2, the second dc power supply 35 may be cut off, or may be reduced in its current supplying capability.

Moreover, in the eighth embodiment, in the same manner as the discharge processing devices 1a, 1b, 1c, 1d, 1e, 1g, etc. shown in FIG. 1, FIG. 8, FIG. 9, FIG. 10, FIG. 11, FIG. 13 and FIG. 15, the diode 7 is used for recovering a current "I$_3$", and the diode 6 is used for protecting the first dc power supply 3, so as to simplify the circuit construction. However, instead of such diodes 6 and 7, switching elements, such as FETs, may be used so as to carry out such recovering and protecting operations.

Figure 18:
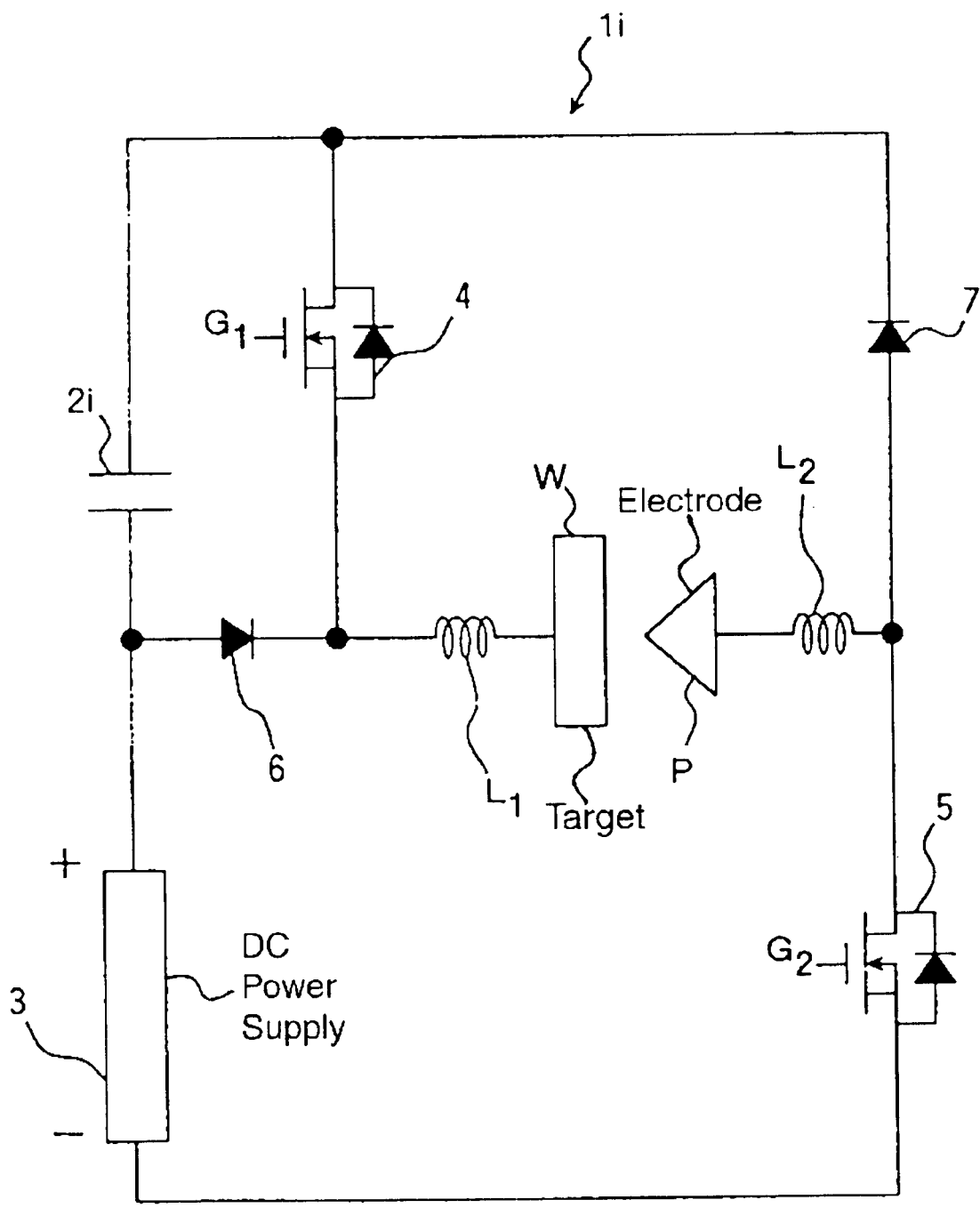
FIG. 18 is a block diagram that shows a discharge processing device in accordance with a ninth embodiment of the present invention.

The discharge processing device in accordance with the ninth embodiment of the present invention is shown in FIG. 18. The components that perform the same functions as those shown in FIG. 1 are provided with the same reference numbers.

Figure 19:
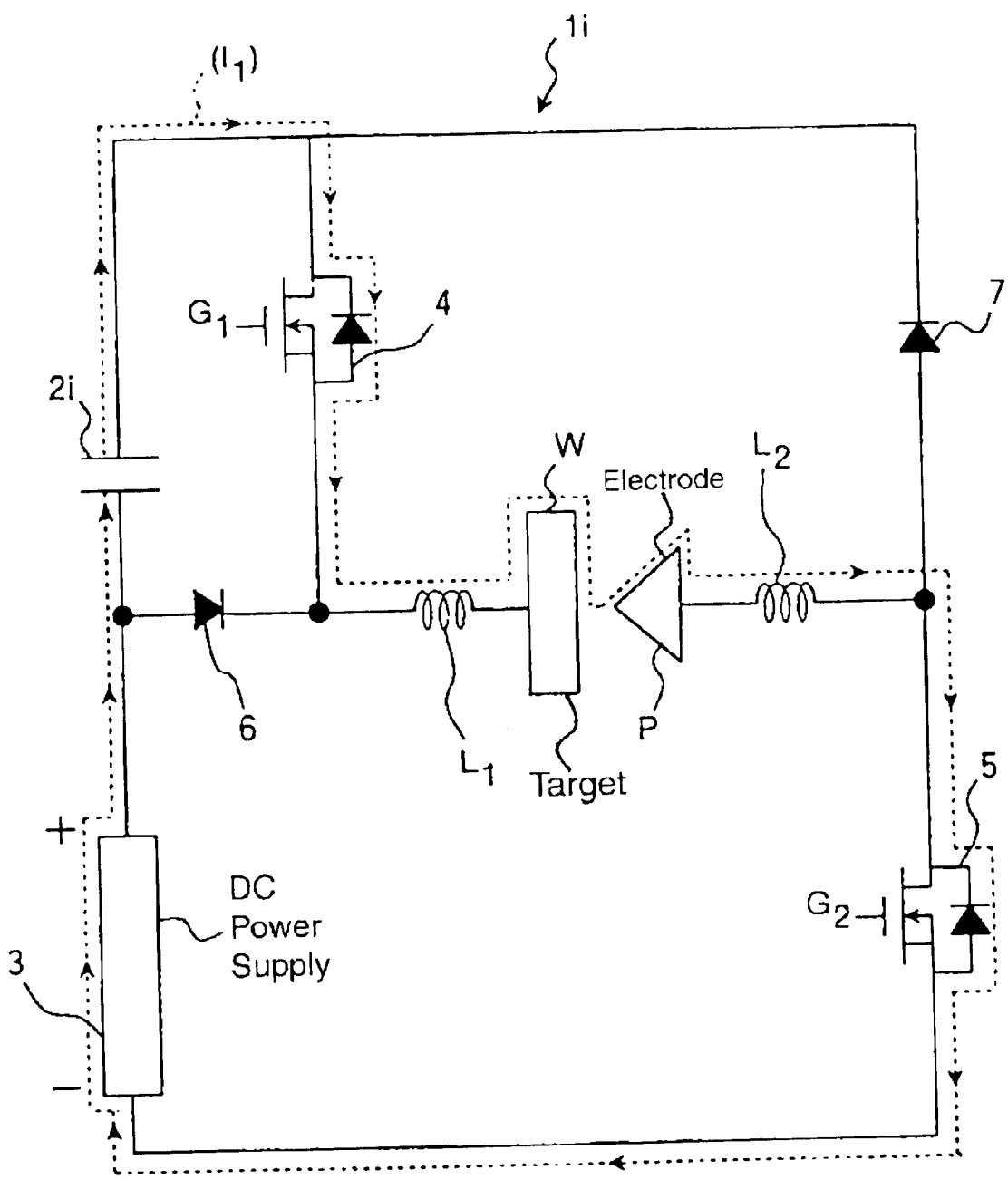
FIG. 19 is a schematic drawing that shows an operation example of the discharge processing device shown in FIG. 18 during an initial processing period.
Figure 20:
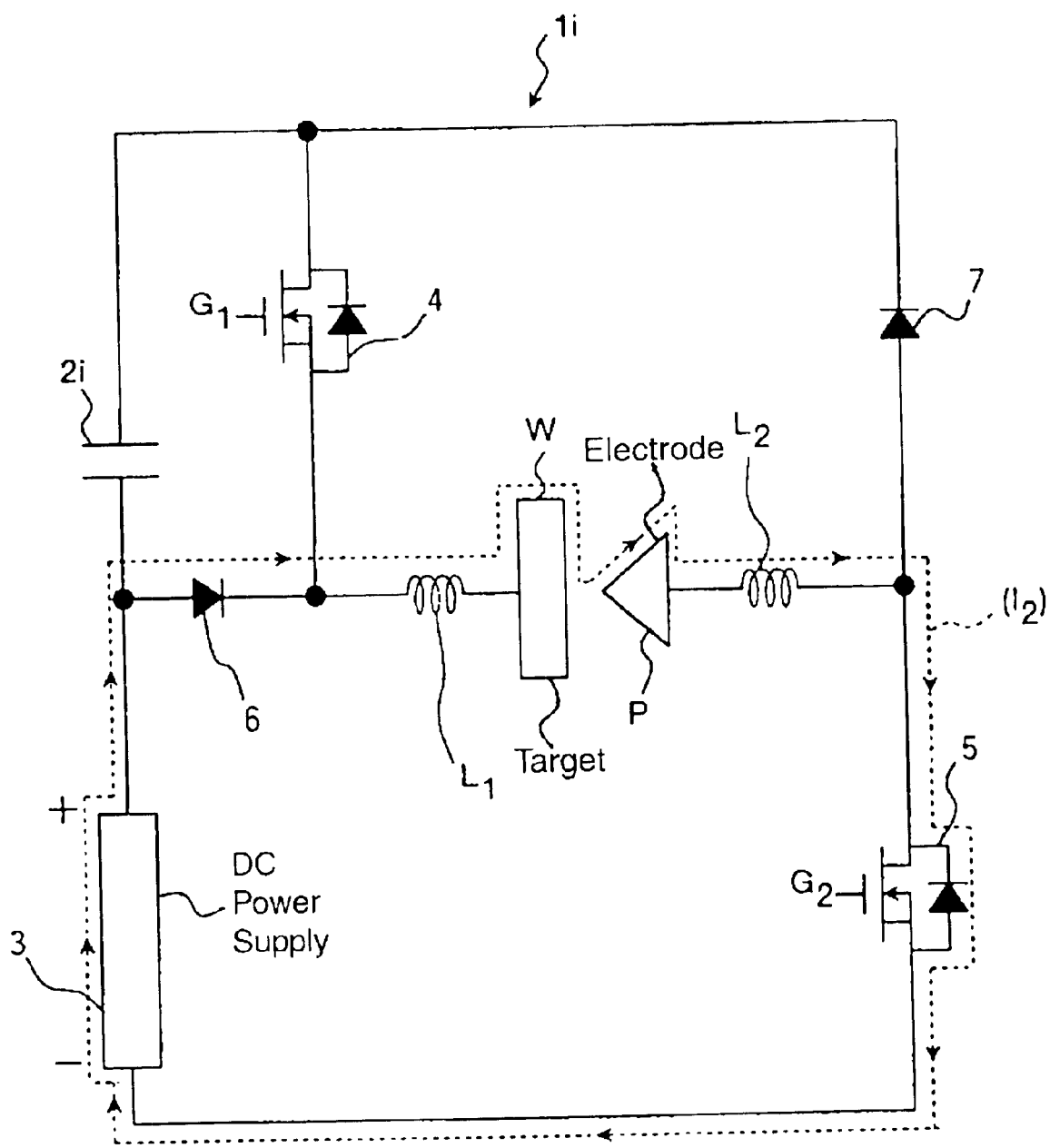
FIG. 20 is a schematic drawing that shows an operation example of the discharge processing device shown in FIG. 18 during a mid processing period.
Figure 21:
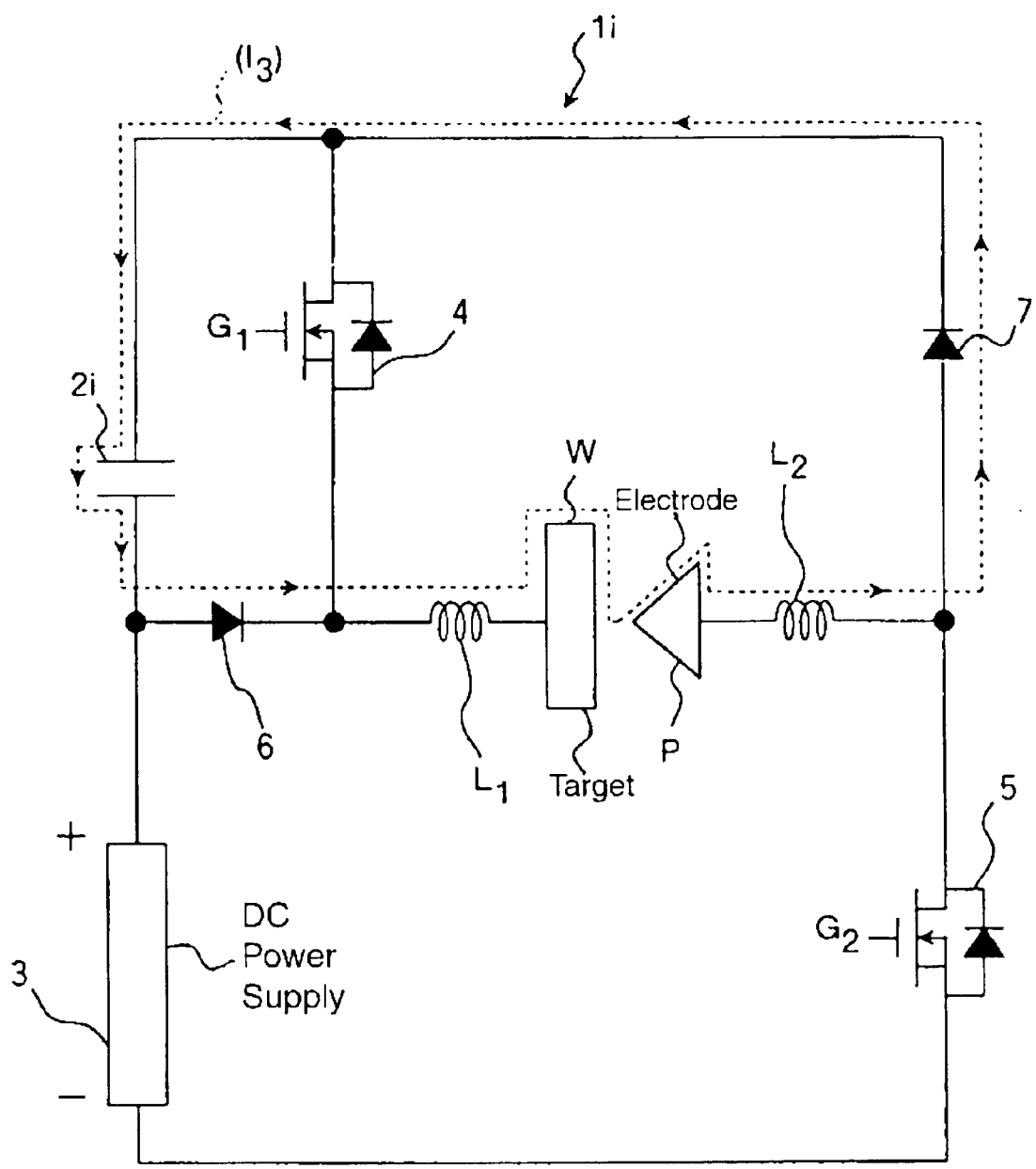
FIG. 21 is a schematic drawing that shows an operation example of the discharge processing device shown in FIG. 18 during a last processing period.

A discharge processing device 1i shown in FIG. 18 is different from the discharge processing device 1a shown in FIG. 1 in the following points: the capacitor 2 is removed therefrom, a capacitor 2i having functions similar to the capacitor 2 is placed between the positive terminal of the first dc power supply 3 and the drain of the first switching element 4 so that, as shown in FIG. 19, during the initial processing period, an output voltage obtained from a series circuit of the first dc power supply 3 and the capacitor 2i is applied between the target W and the electrode P so as to allow a current "I$_1$" to flow through a loop consisting of: one end of the capacitor 2i to the first switching element 4 to the floating reactor L$_1$ to the target W to the electrode P to the floating reactor L$_2$ to the second switching element 5 to the first dc power supply 3 to the other end of the capacitor 2i. Moreover, as shown in FIG. 20, during the mid processing period, a current "I$_2$" is allowed to flow through a loop consisting of: the positive terminal of the first dc power supply 3 to the diode 6 to the floating reactor L$_1$ to the target W to the electrode P to the floating reactor L$_2$ to the second switching element 5 to the negative terminal of the first dc power supply 3, and as shown in FIG. 21, during the last processing period, a current "I$_3$" is allowed to flow through a loop consisting of: the floating reactor L$_2$ to the diode 7 to the capacitor 2i to the diode 6 to the floating reactor L$_1$ to the target W to the electrode P to the floating reactor L$_2$.

With such an arrangement, in the same manner as the discharge processing device 1a shown in FIG. 1, it is possible to use the first switching element 4 having a low voltage resistance and a low capacity so as to reduce the costs of the entire device, to simplify the adjustments of the peak value of the processing current and the processing pulse width thereof, to provide a processing current "Ipw" having a virtually rectangular shape while improving the degree of freedom in designing by providing a variety of layouts for the capacitor 2i for supplying the initial current, and consequently to improve the discharge processing efficiency.

Figure 22:
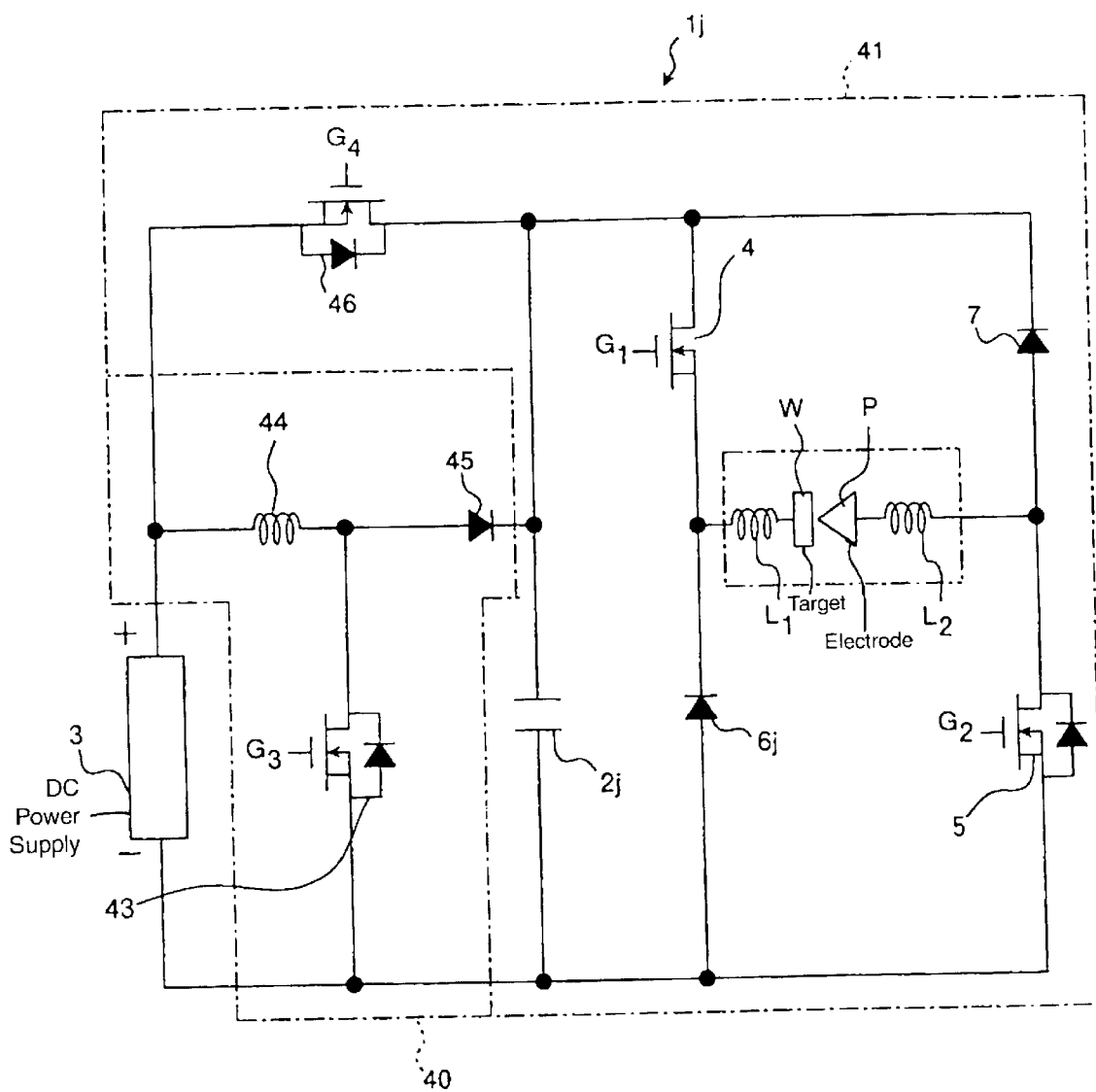
FIG. 22 is a block diagram that shows a discharge processing device in accordance with a tenth embodiment of the present invention.

The discharge processing device in accordance with the tenth embodiment of the present invention is shown in FIG. 22. The components that perform the same functions as those shown in FIG. 1 are provided with the same reference numbers.

A discharge processing device 1j shown in FIG. 22 is provided with a first dc power supply 3 for outputting a dc voltage that forms a processing current "Ipw", an up converter circuit 40 for voltage-raising the dc current output from the first dc power supply 3 and a processing current generation circuit 41 for allowing the processing current "Ipw" to flow between the target W and the electrode P by using the dc voltage that has been voltage-raised and output from the up converter 40 and the dc voltage output from the first dc power supply 3, and in this arrangement, prior to starting to process the target W, the dc voltage output from the first dc power supply 3 is voltage-raised by the up converter circuit 40 so that a high voltage is accumulated in the capacitor 2j of the processing current generation circuit 41; thereafter, the charge accumulated in the capacitor 2j and the dc voltage output from the first dc power supply 3 are used to allow the processing current generation circuit 41 to form a processing current so that the processing current "Ipw" is allowed to flow between the target W and the electrode.

The up converter circuit 40 is provided with a third switching element 43 which, based upon the pulse "$VG_3$" output from the switching element driving circuit (not shown), cuts and connects the dc voltage output from the first dc power supply 3, a reactor 44 which takes in the dc voltage that is cut and connected by the third switching element 43, and generates an induced electromotive voltage, and a diode 45 which single-wave rectifies the induced electromotive voltage induced by the reactor 44, and directs this to the capacitor 2j of the processing current generation circuit 41 so as to be charged, and in this arrangement, prior to starting to process the target W, the dc voltage output from the first dc power supply 3 is cut and connected so that an induced electromotive voltage is generated, and this induced electromotive voltage is single-wave rectified, and the resulting dc voltage is directed to the capacitor 2j of the processing current generation circuit 41 so as to charge this.

The processing current generation circuit 41 is provided with the capacitor 2j which applies a terminal voltage between the target W and the electrode P so as to allow a current "$I_1$" for the initial processing period to flow, first, second and fourth switching elements 4, 5 and 46 which are constituted by transistors, FETs, etc., and switch power supply paths to the target W in accordance with pulses "$VG_1^1$", "$VG_2$" and "$VG_4$" output from the switching element driving circuit (not shown), and diodes 6j and 7 which, when among the first, second and fourth switching elements 4, 5 and 46, the first and second switching elements 4 and 5 are turned off so that the last processing period is going on, are turned on so as to direct an induced electromotive current "$I_3$" generated in the floating reactors $L_1$ and $L_2$ that are possessed by respective cables connected to the target W and the electrode P to the capacitor 2j so as to be charged, and in this arrangement, during the initial processing period, the terminal voltage output by the capacitor 2j is used so as to allow a processing current "Ipw" to flow between the target W and the electrode P, and during the mid processing period, the dc voltage output by the first dc power supply 3 is used so as to allow the processing current "Ipw" to flow between the target W and the electrode P, while, during the last processing period, an induced electromotive voltage is generated by the induced energy accumulated in the floating reactors $L_1$ and $L_2$ so as to charge the capacitor 2j.

Next, referring to FIG. 23 to FIG. 28, an explanation will be given of the operation of the discharge processing device 1j. First, when, prior to starting to process the target W, a sufficient charge has not been accumulated in the capacitor 2j, the pulse "$VG_3$" is output from the switching element driving circuit shown by (c) in FIG. 23 to turn the third switching element 43 on so that, as shown in FIG. 24, a current "$I_4$" is allowed to flow through a loop consisting of: the positive terminal of the first dc power supply 3 to the reactor 44 to the third switching element 43 to the negative terminal of the first dc power supply 3, thereby accumulating induced energy in the reactor 44.

Figure 23:
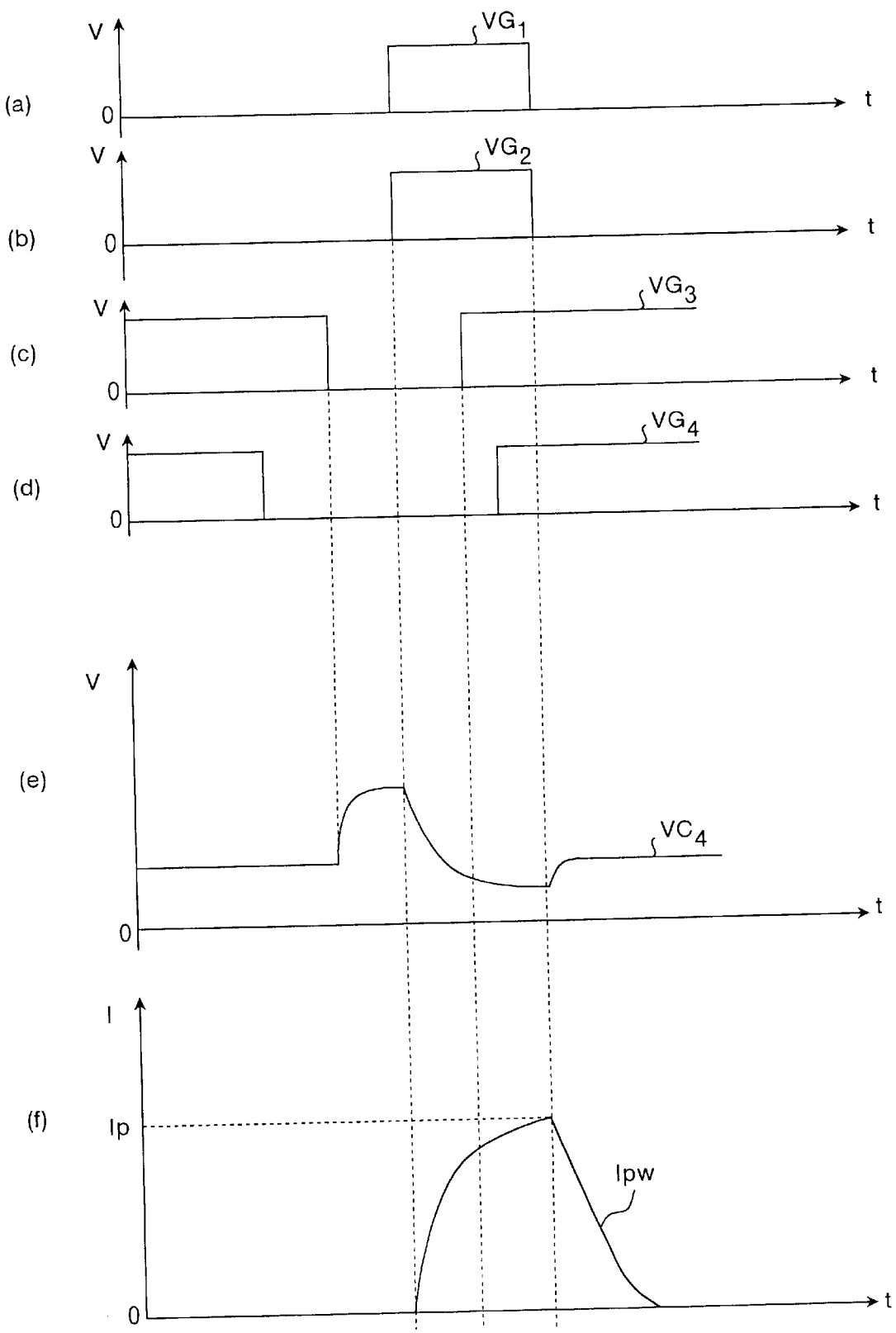
FIG. 23 is a waveform diagram that shows an operation example of the discharge processing device shown in FIG. 22.
Figure 24:
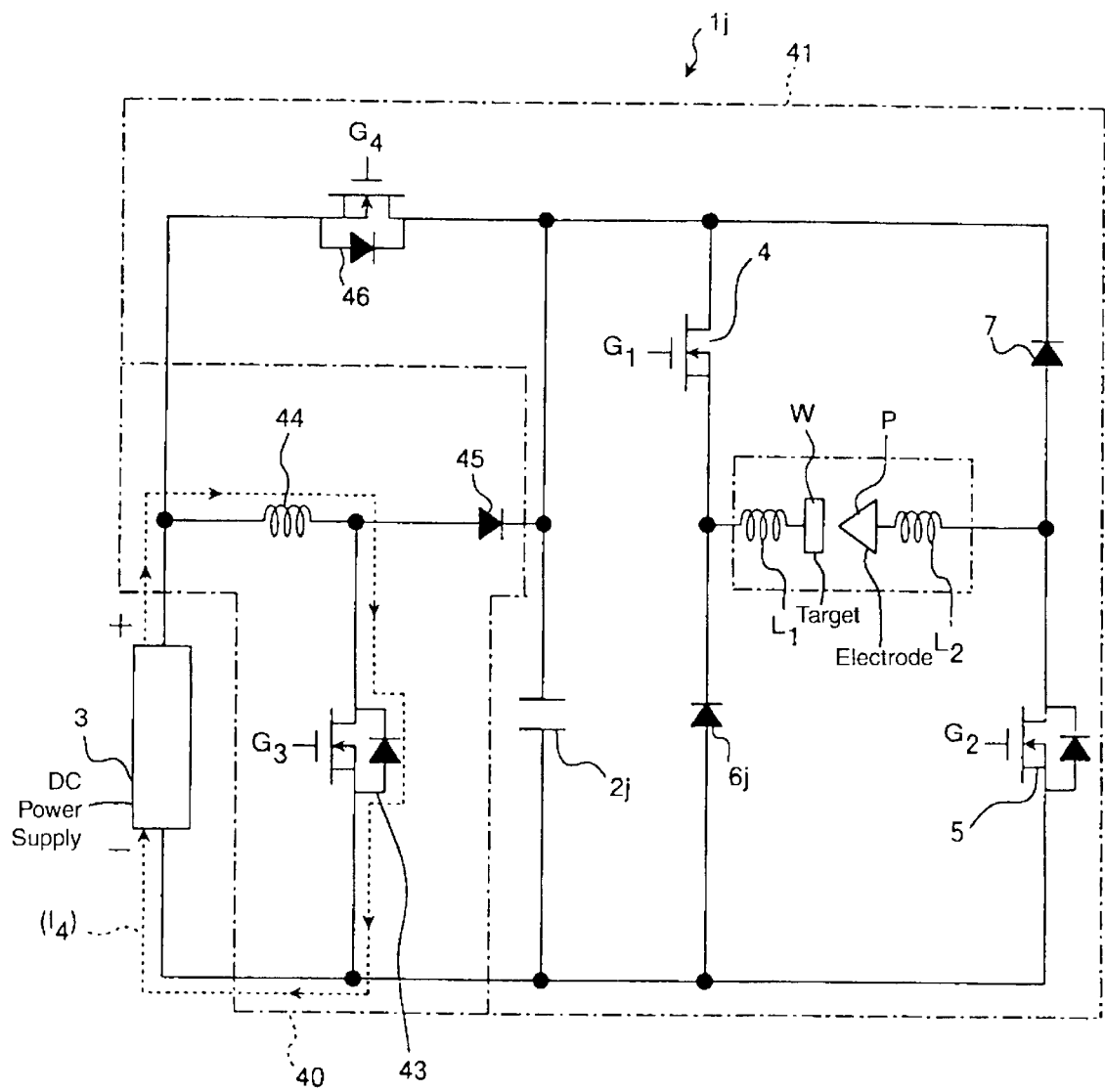
FIG. 24 is a schematic drawing that shows an operation example of the discharge processing device shown in FIG. 22 prior to the initial processing period.
Figure 25:
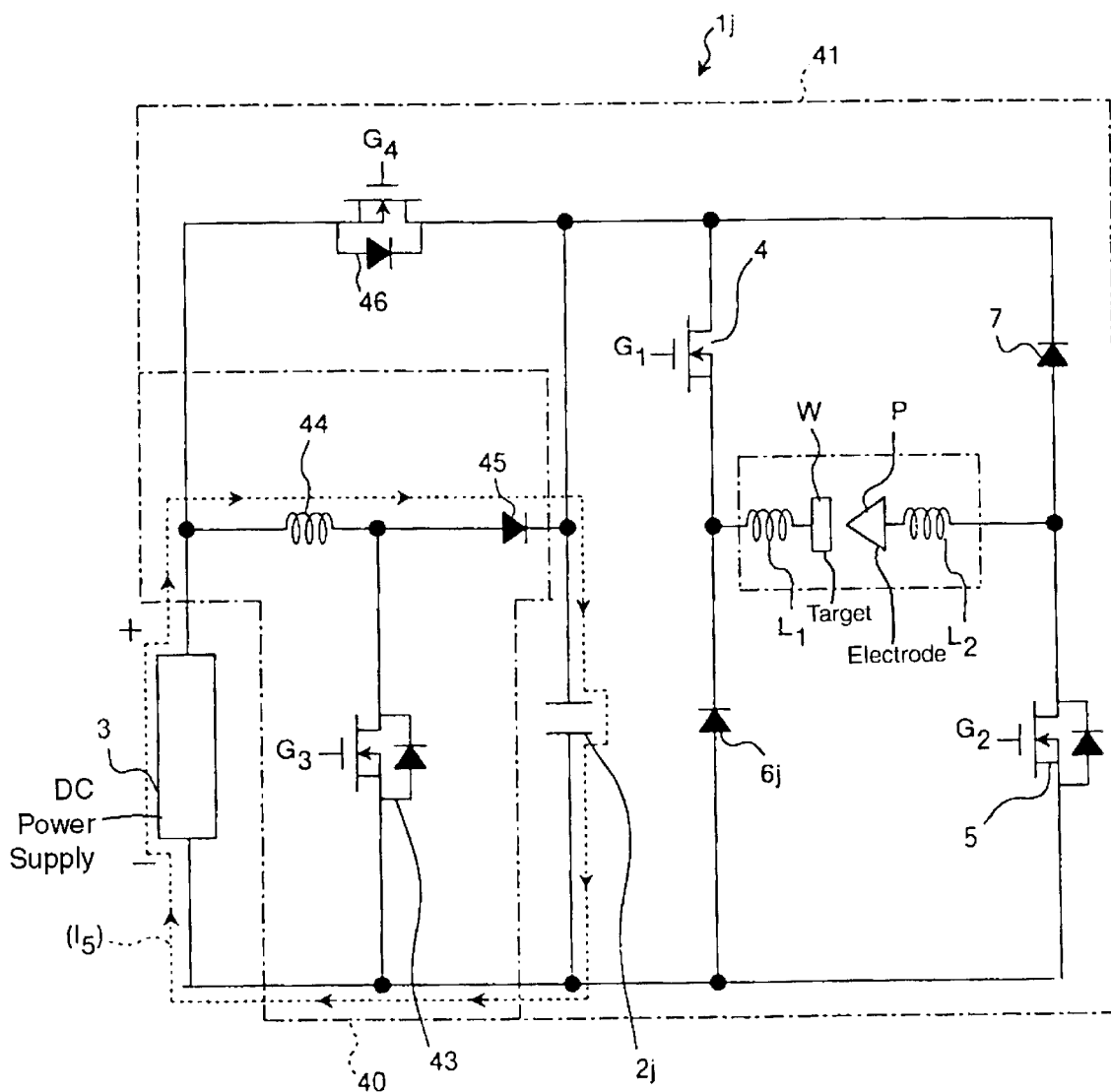
FIG. 25 is a schematic drawing that shows an operation example of the discharge processing device shown in FIG. 22 prior to the initial processing period.
Figure 26:
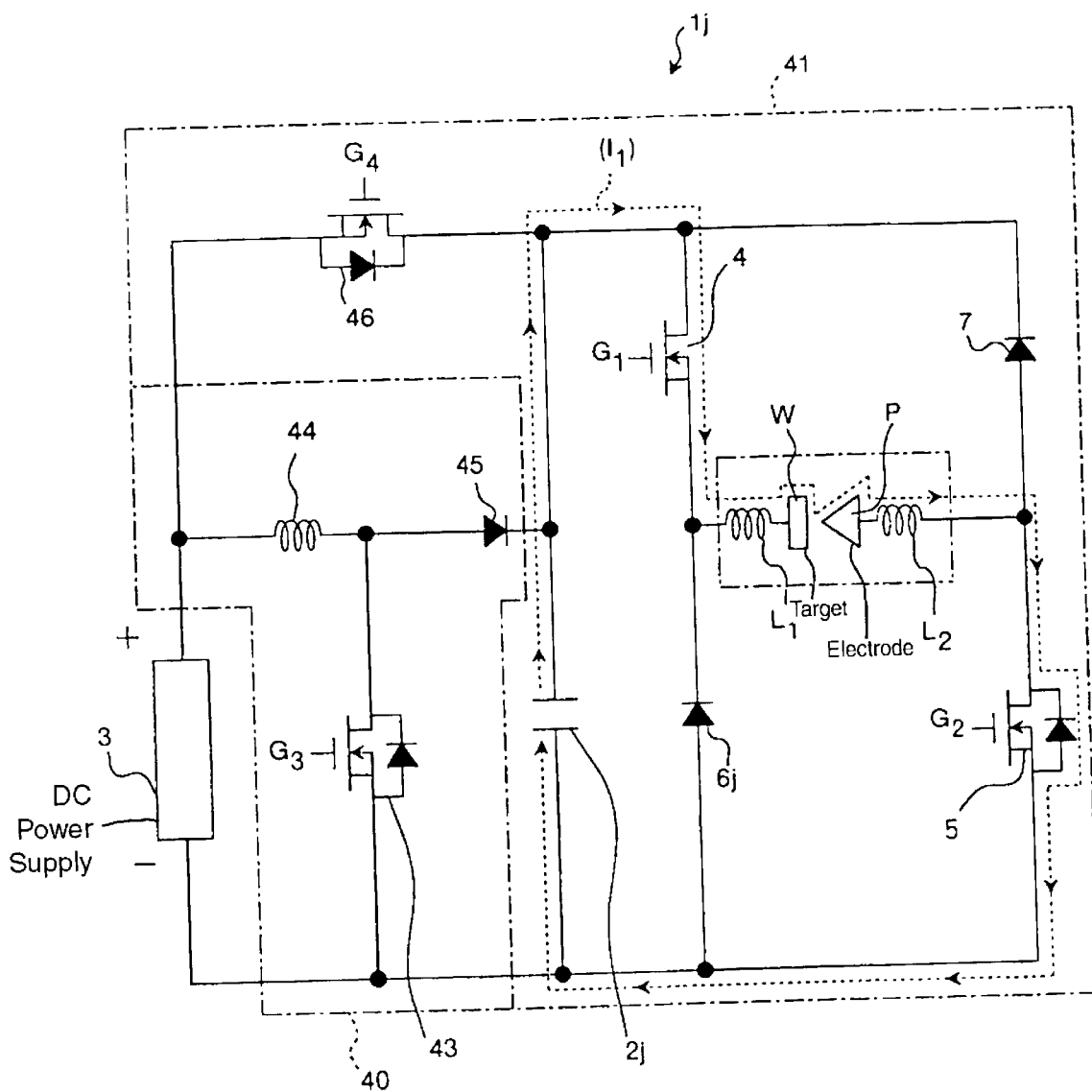
FIG. 26 is a schematic drawing that shows an operation example of the discharge processing device shown in FIG. 22 prior to the initial processing period.

Thereafter, when the output of the pulse "$VG_3$" from the switching element driving circuit is stopped to allow the third switching element 43 to be turned off, an induced electromotive voltage is generated by the induced energy accumulated in the reactor 44 so that, as shown in FIG. 25, a current "$I_5$" is allowed to flow through a loop consisting of: one end of the reactor 44 to the diode 45 to the capacitor 2j to the first dc power supply 3 to the other end of the reactor 44, thereby accumulating a charge in the capacitor 2j as shown by (e) in FIG. 23 to increase the terminal voltage Next, as shown by (a) and (b) in FIG. 23, when during the initial processing period, the pulses "$VG_1^1$" and "$VG_2$" are output from the switching element driving circuit, the first switching element 4 and the second switching element 5 are turned on to use the charge accumulated in the capacitor 2j so that, as shown in FIG. 26, a current "$I_1$" is allowed to flow through a loop consisting of: one end of the capacitor 2j to the first switching element 4 to the floating reactor $L_1$ to the target W to the electrode P to the floating reactor $L_2$ to the second switching element 5 to the other end of the capacitor 2j, there by allowing a processing current "Ipw" having the same value as the current "$I_1$" to flow between the target W and the electrode P as shown by (f) in FIG. 23.

Figure 27:
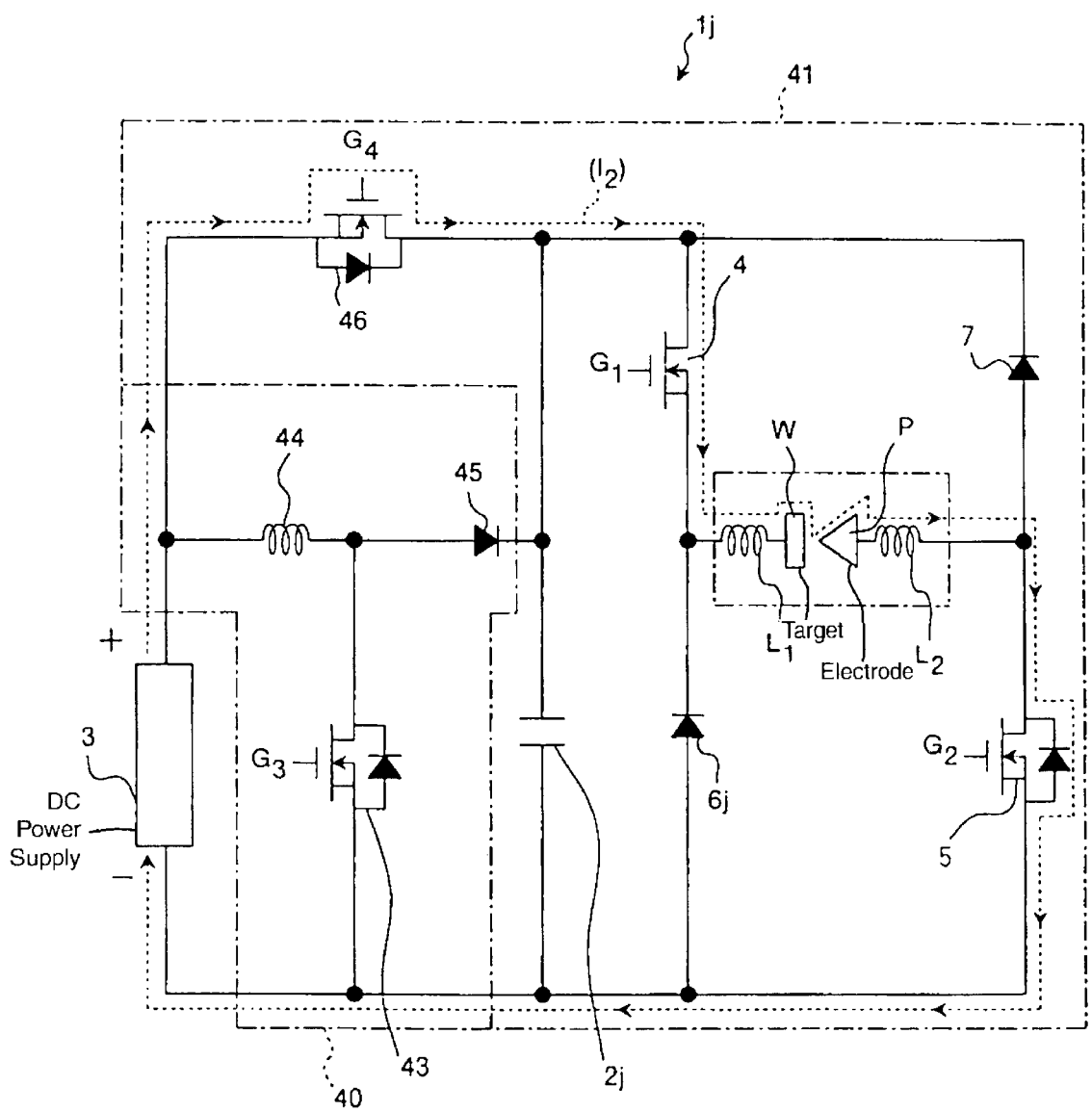
FIG. 27 is a schematic drawing that shows an operation example of the discharge processing device shown in FIG. 22 during a mid processing period.

Next, after a lapse of predetermined time, the sequence proceeds to the mid processing period, and when the pulse "$VG_4$" is output from the switching element driving circuit as shown by (d) in FIG. 23, the fourth switching element 46 is turned on so that, as shown in FIG. 27, a current "$I_2$" is allowed to flow through a loop consisting of: the positive terminal of the first dc power supply 3 to the fourth switching element 46 to the first switching element 4 to the floating reactor $L_1$ to the target W to the electrode P to the floating reactor $L_2$ to the second switching element 5 to the negative terminal of the first dc power supply 3, thereby allowing a processing current "Ipw" having the same value as the current "$I_2$" to flow between the target W and the electrode P, as well as gradually increasing the current peak in accordance with the voltage value of the dc voltage output from the first dc power supply 3.

Figure 28:
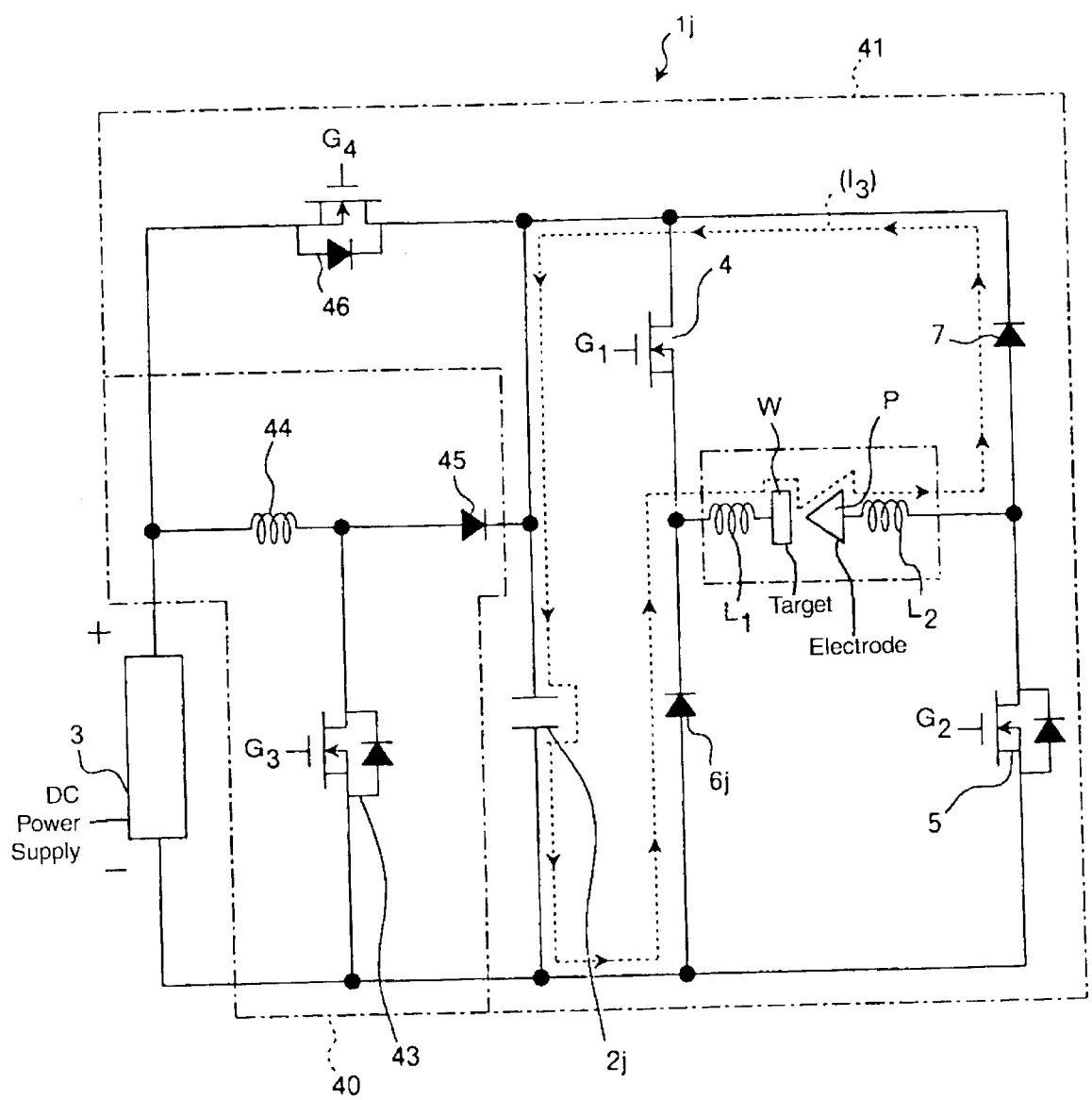
FIG. 28 is a schematic drawing that shows an operation example of the discharge processing device shown in FIG. 22 during a last processing period.

Next, after a lapse of predetermined time, the sequence proceeds to the last processing period, and when the outputs of the pulses "VG$_1$" and "VG$_2$" from the switching element driving circuit are stopped, the first and second switching elements 4 and 5 are turned off to generate an induced electromotive voltage by the induced energy accumulated in the floating reactors L$_1$ and L$_2$ so that, as shown in FIG. 28, an induced current "I$_3$" is allowed to flow through a loop consisting of: the floating reactor L$_2$ to the diode 7 to the capacitor 2j to the diode 6j to the floating reactor L$_1$ to the target W to the electrode P to the floating reactor L$_2$, thereby allowing the processing current "Ipw" flowing between the target W and the electrode P to abruptly drop, as well as accumulating a charge in the capacitor 2j to increase the terminal voltage.

In this manner, in the tenth embodiment, when, prior to starting to process the target W, a sufficient charge has not been accumulated in the capacitor 2j, the up converter circuit 40 is operated to raise the dc voltage output from the first dc power supply 3, and after the capacitor 2j has been charged by the resulting high voltage, the processing current generation circuit 41 generates a processing current "Ipw" so as to process the target W. Therefore, the stable processing current "Ipw" having a virtually rectangular shape is generated immediately after the start of the processing operation, while reducing the voltage resistance and the current capacity of the first switching element 4 so as to reduce the costs of the entire device. Consequently, it becomes possible to improve the processing efficiency, and even in the event of a shortage of the charge of the capacitor 2j due to an unexpected situation such as a load fluctuation, it is possible to always maintain the quantity of charge accumulated in the capacitor 2j in an optimal state by using a simple circuit utilizing the first dc power supply 3, and consequently to stabilize the operation.

Figure 29:
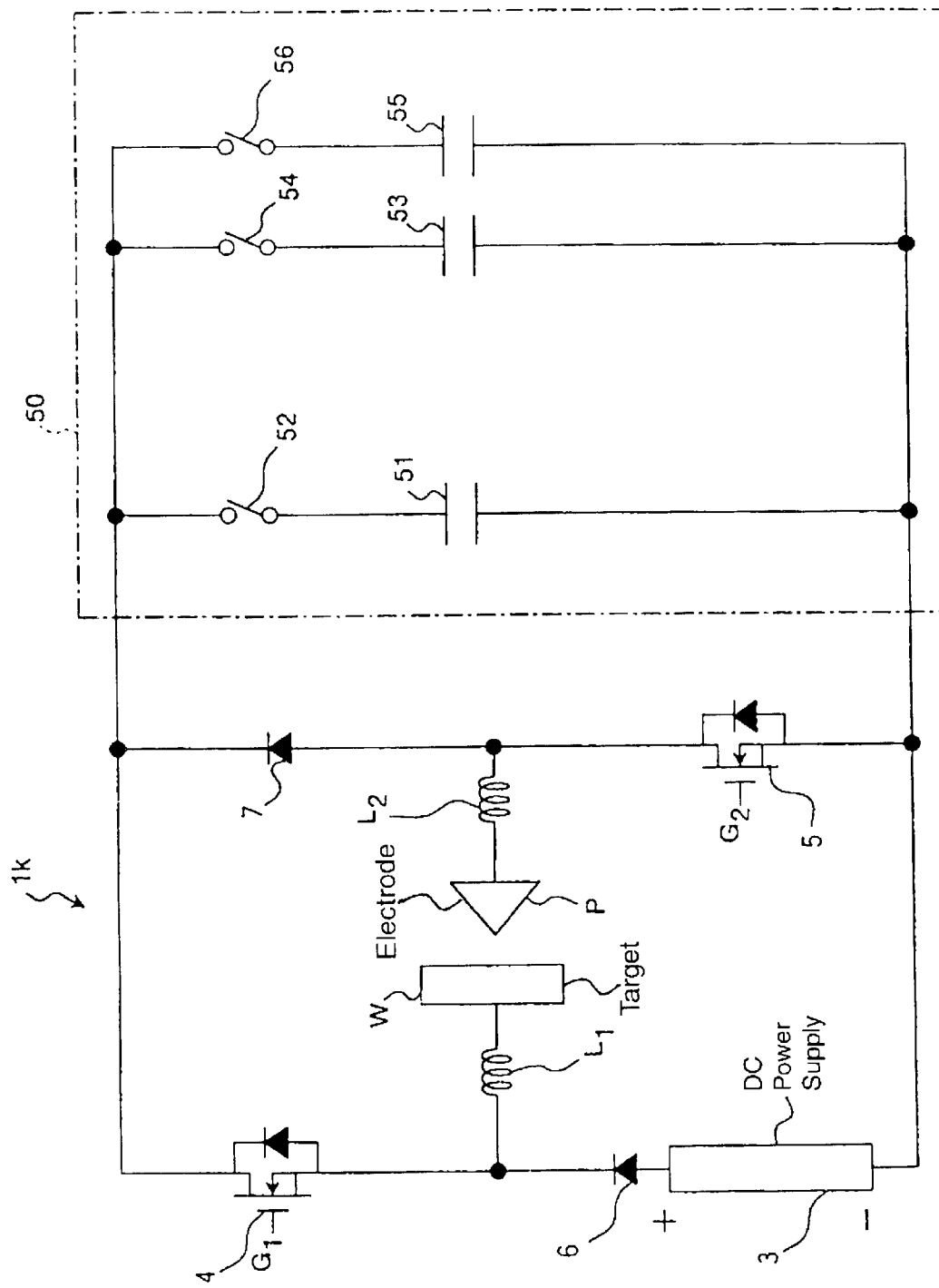
FIG. 29 is a block diagram that shows a discharge processing device in accordance with an eleventh embodiment of the present invention.

The discharge processing device in accordance with the eleventh embodiment of the present invention is shown in FIG. 29. The components that perform the same functions as those shown in FIG. 1 are provided with the same reference numbers.

A discharge processing device 1k shown in FIG. 29 is different from the discharge processing device 1a shown in FIG. 1 in that, instead of the capacitor 2, a capacitor circuit 50 of a capacity-variable type is installed, and by switching the capacity of this capacitor circuit 50, the waveform of the processing current "Ipw" is adjusted in its shape during the initial processing period.

The capacitor circuit 50 is constituted by a capacitor 51 having a predetermined capacity of, for example, "0.1 $\mu$F", a switching element 52 which is constituted by an FET, etc., series-connected to this capacitor 51, and which, upon receipt of an ON signal from the switching element driving circuit, is allowed to conduct so as to connect one end of the capacitor 51 the other end of which is connected to the negative terminal of the first dc power supply 3, to the cathode of the diode 7, a capacitor 53 having a capacity of "0.2 $\mu$F" that is twice as much as the capacity of the capacitor 51, a switching element 54 which is constituted by an FET, etc., series-connected to this capacitor 53, and which, upon receipt of an ON signal from the switching element driving circuit, connects one end of the capacitor 53 the other end of which is connected to the negative terminal of the first dc power supply 3, to the cathode of the diode 7, a capacitor 55 having a capacity of "0.4 $\mu$F" that is twice as much as the capacity of the capacitor 53, and a switching element 56 which is constituted by an FET, etc., series-connected to this capacitor 55, and which, upon receipt of an ON signal from the switching element driving circuit, is allowed to conduct so as to connect one end of the capacitor 55 the other end of which is connected to the negative terminal of the first dc power supply 3, to the cathode of the diode 7.

Here, depending on the type, thickness, etc., of the target W, the switching element driving circuit selectively turns the respective switching elements 52, 54 and 56 on so that the entire capacity of the capacitor circuit 50 is adjusted; thus, the value of the current output from the capacitor circuit 50 and the quantity of charge accumulated in the capacitor circuit 50 are adjusted so that, during the initial processing period, the waveform of the processing current "Ipw" flowing between the target W and the electrode P is optimized.

In this manner, in the eleventh embodiment, the capacity of the capacitor circuit 50 is adjusted so that, during the initial processing period, the waveform of the processing current "Ipw" flowing between the target W and the electrode P is adjusted; thus, the charge to be accumulated in the capacitor circuit 50 serving as the capacitor of the initial current supplying circuit is made to be adjustable so as to provide an abrupt rising portion in the processing current waveform so that it becomes possible to improve the discharge processing efficiency, to use a first switching element 4 having a low voltage resistance and a low capacity so as to reduce the costs of the entire device, and consequently to simplify the adjustments of the peak value and the processing pulse width of the discharge processing current.

Moreover, in the eleventh embodiment, the capacities of the respective capacitors 51, 52 and 53 are set to "0.1 $\mu$F", "0.2 $\mu$F" and "0.4 $\mu$F" so as to be switched every "0.1 $\mu$F" in 8 steps from "0 $\mu$F" to "0.7 $\mu$F". Therefore, when the capacity of the capacitor circuit 50 is switched, the capacity-switching process can be carried out in a format suitable for digital processing.

Furthermore, in the first through eleventh embodiments, a single switching element having voltage resistance and a current capacity that are determined by designing is used as the first switching element 4. However, in lieu of such a switching element, a plurality of switching elements having the same voltage resistance and current capacity may be connected in parallel or in series with each other, and these may be used as the first switching element 4.

This arrangement makes it possible to use inexpensive switching elements, and consequently to maintain the first switching element 4 having voltage resistance and a current capacity that are required, while reducing the costs.

As described above, in the discharge processing device of the present invention, a processing current is allowed to start to flow between the target and the electrode by using the energy accumulated in the capacitor of the initial current supplying circuit so that it is possible to use a switching element having a low voltage resistance and a low capacity so as to reduce the costs of the entire device, to simplify the adjustments of the peak value and the processing pulse width of the discharge processing current, to provide abrupt rising and falling portions of the discharge processing current waveform, and consequently to improve the discharge processing efficiency.

Furthermore, even when the value of the voltage output from the capacitor of the initial current supplying circuit becomes lower than a voltage value preliminarily set, the diode is used to detect this fact so as to apply a current for use in mid processing period to flow between the target and the electrode, without the need of using a switching element driving circuit, etc. so as to on/off control each switching element so that it is possible to use a switching element having a low voltage resistance and a low capacity so as to reduce the costs of the entire device, to simplify the adjustments of the peak value and the processing pulse width of the discharge processing current, to provide abrupt rising and falling portions of the discharge processing current waveform, and consequently to improve the discharge processing efficiency.

Furthermore, it is possible to prevent a charge from being accumulated in the capacitor of the initial current supplying circuit beyond a quantity required for the capacitor of the initial current supplying circuit so as to prevent disturbances in a processing current waveform of the next cycle and thereafter, and consequently to provide an accurate control, so that it becomes possible to use a switching element having a low voltage resistance and a low capacity so as to reduce the costs of the entire device, to simplify the adjustments of the peak value and the processing pulse width of the discharge processing current, to provide abrupt rising and falling portions of the discharge processing current waveform, and consequently to improve the discharge processing efficiency.

Furthermore, the discharge processing device allows the capacitor of the initial current supplying circuit to accumulate a sufficient quantity of charge required so as to prevent disturbances in a processing current waveform of the next cycle and thereafter and consequently to provide an accurate control, so that it becomes possible to use a switching element having a low voltage resistance and a low capacity so as to reduce the costs of the entire device, to simplify the adjustments of the peak value and the processing pulse width of the discharge processing current, to provide abrupt rising and falling portions of the discharge processing current waveform, and consequently to improve the discharge processing efficiency.

Furthermore, even when the dc power supply contains floating inductance components, this arrangement provides an abrupt rising portion in the processing current waveform so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current.

Furthermore, even when a low arc voltage, this arrangement maintains a virtually rectangular processing current waveform so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current.

Furthermore, the discharge processing device makes it possible to prevent the current value of the mid processing period from becoming far greater than the current value of the initial processing period so as to maintain a virtually rectangular processing current waveform so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current.

Furthermore, the discharge processing device allows the capacitor of the initial current supplying circuit to maintain a sufficient charge so as to prevent disturbances in the processing current waveform in the next cycle and thereafter and consequently to provide an accurate control, so that it becomes possible to use a switching element having a low voltage resistance and a low capacity so as to reduce the costs of the entire device, to simplify the adjustments of the peak value and the processing pulse width of the discharge processing current, to provide abrupt rising and falling portions of the discharge processing current waveform, and consequently to improve the discharge processing efficiency.

Furthermore, prior to starting a processing operation on the target, the capacitor of the initial current supplying circuit is allowed to accumulate a sufficient charge so as to provide an abrupt rising portion of the discharge processing current waveform in the initial processing period so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current.

Furthermore, the discharge processing device makes it possible to vary the layout of the capacitor of the initial current supplying circuit so as to further improve the degree of freedom in designing so that it becomes possible to use a switching element having a low voltage resistance and a low capacity so as to reduce the costs of the entire device, to simplify the adjustments of the peak value and the processing pulse width of the discharge processing current, to provide abrupt rising and falling portions of the discharge processing current waveform, and consequently to improve the discharge processing efficiency.

Furthermore, prior to starting a processing operation on the target, the capacitor of the initial current supplying circuit is allowed to accumulate a sufficient charge so as to provide abrupt rising and falling portions of the discharge processing current waveform in the initial processing period, so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current Furthermore, it is possible to freely adjust a charge to be accumulated in the capacitor of the initial current supplying circuit so as to provide an abrupt rising portion of the discharge processing current waveform in the initial processing period so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current.

Furthermore, the discharge processing device makes it possible to freely adjust a charge to be accumulated in the capacitor of the initial current supplying circuit in a stepped manner so as to provide an abrupt rising portion of the discharge processing current waveform in the initial processing period so that it becomes possible to improve the discharge processing efficiency, to use a switching element having a low voltage resistance and a low capacity so as to reduce the costs of the entire device, and consequently to simplify the adjustments of the peak value and the processing pulse width of the discharge processing current.

Furthermore, the discharge processing device makes it possible to maintain a switching element having required voltage resistant and current capacity independent of the voltage resistance and current capacity of the switching element so as to reduce the costs of the entire device so that it becomes possible to improve the discharge processing efficiency, while reducing the costs of the entire device, and consequently to simplify the adjustments of the peak value and the processing pulse width of the discharge processing current.

Furthermore, the switching elements used for supplying a current from the capacitor of the initial current supplying circuit are set to be smaller in their capacities than those switching elements used for feeding induced energy back to the capacitor of the initial current supplying circuit, or to be smaller in the number of parallel connections; consequently, it becomes possible to reduce the number of parallel connections, or to use those switching elements having smaller capacities, and consequently to simplify the construction.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A discharge processing device which processes a target by applying a processing current between the target and an electrode, the discharge processing device comprising:

an initial-stage current supplying circuit having a capacitor supplying an initial current, the initial-stage current supplying circuit also supplying a processing current between the target and the electrode during an initial processing period;

an intermediate-stage current supplying circuit having a dc power supply and supplying the processing current between the target and the electrode during an intermediate processing period; and a feedback circuit that charges the capacitor of the initial-stage current supplying circuit with energy accumulated during the intermediate processing period, in a last-processing period.

2. The discharge processing device according to claim 1, wherein the intermediate-stage current supplying circuit detects, with a diode, when voltage output of the initial stage current supplying circuit falls below a preset voltage and, in response, supplies the processing current between the target and the electrode.

3. The discharge processing device according to claim 1, wherein the feedback circuit monitors terminal voltage of the capacitor and, when the terminal voltage of the capacitor has reached a predetermined voltage, stops charging of the capacitor.

4. The discharge processing device according to claim 1, wherein the feedback circuit monitors terminal voltage of the capacitor and, in response, controls dc voltage output from the dc power supply of the intermediate-stage current supplying circuit.

5. The discharge processing device according to claim 1, wherein the intermediate-stage current supplying circuit has a second capacitor connected in parallel with the dc power supply, and the second capacitor supplies the processing current between the target and the electrode during the intermediate processing period.

6. The discharge processing device according to claim 1, wherein the intermediate-stage current supplying circuit has a switching element, that is turned on/off to connect/disconnect the processing current flowing between the target and the electrode during the intermediate processing period to make the processing current constant.

7. The discharge processing device according to claim 1, wherein the intermediate-stage current supplying circuit switches current loops during the intermediate processing period so that a loop without the dc power supply is used for the current flow.

8. The discharge processing device according to claim 1, wherein, prior to complete discharge of the capacitor, the intermediate-stage current supplying circuit starts operation in the intermediate processing period and supplies the processing current between the target and the electrode.

9. The discharge processing device according to claim 1, further comprising a preliminary charging circuit having a dc power supply for outputting a dc voltage higher than a dc voltage output from the dc power supply of the intermediate-stage current supplying circuit, and wherein, prior to the initial processing period, the dc voltage output from the dc power supply of the preliminary charging circuit preliminarily charges the capacitor.

10. The discharge processing device according to claim 1, wherein, when the processing current flows between the target and the electrode from the capacitor, a loop passing through the dc power supply of the intermediate-stage current supplying circuit is used.

* * * * *